(12) United States Patent
Westrick, Jr. et al.

(10) Patent No.: US 11,873,980 B2
(45) Date of Patent: Jan. 16, 2024

(54) AUTOMATIC ORIENTATION TECHNIQUES FOR PHOTOCONTROLS OF INTELLIGENT LIGHTING FIXTURES

(71) Applicant: ABL IP Holding LLC, Atlanta, GA (US)

(72) Inventors: Richard Lee Westrick, Jr., Social Circle, GA (US); Mark Norton, Oxford, GA (US)

(73) Assignee: ABL IP Holding LLC, Atlanta, GA (US)

( * ) Notice: Subject to any disclaimer, the term of this patent is extended or adjusted under 35 U.S.C. 154(b) by 181 days.

(21) Appl. No.: 17/477,740

(22) Filed: Sep. 17, 2021

(65) Prior Publication Data
US 2023/0090358 A1  Mar. 23, 2023

(51) Int. Cl.
*F21V 23/04* (2006.01)
*H05B 47/11* (2020.01)
*F21W 131/103* (2006.01)

(52) U.S. Cl.
CPC .......... *F21V 23/0464* (2013.01); *H05B 47/11* (2020.01); *F21W 2131/103* (2013.01)

(58) Field of Classification Search
CPC ................ F21V 23/0464; H05B 47/11; F21W 2131/103
See application file for complete search history.

(56) References Cited

U.S. PATENT DOCUMENTS

| 2,756,349 | A | 7/1956 | Frank |
| 4,477,143 | A | 10/1984 | Taylor |
| 8,864,514 | B2 | 10/2014 | Ilyes |
| 9,651,420 | B2 | 5/2017 | Weber |
| 2016/0103016 | A1* | 4/2016 | Weber ................. F21V 23/0464 250/227.11 |
| 2019/0350065 | A1* | 11/2019 | Stuby, Jr. ............. H01R 13/514 |
| 2020/0217468 | A1* | 7/2020 | Brown .................... H04W 4/50 |

OTHER PUBLICATIONS

Bohar et al., "Spectral-Temporal LED Lighting Modules for Reproducing Daily and Seasonal Solar Circadian Rhythmicities", Available online at https://www.researchgate.net/publication/317035404_Spectral-Temporal_LED_Lighting_Modules_for_Reproducing_Daily_and_Seasonal_Solar_Circadian_Rhythmicities, May 2017, 6 pages.

* cited by examiner

*Primary Examiner* — Alexander H Taningco
*Assistant Examiner* — Pedro C Fernandez
(74) *Attorney, Agent, or Firm* — Kilpatrick Townsend & Stockton LLP

(57) ABSTRACT

A photocontrol, such as for an outdoor intelligent lighting fixture, may detect levels of ambient light at multiple sections of the photocontrol. The ambient light may be detected via multiple photosensors located at the photocontrol sections. In addition, the ambient light may be detected via multiple color filters (or sections of a color filter) located at the photocontrol sections. The photocontrol may determine an ambient light differential, such as an instant differential between light received at the multiple photocontrol sections at a particular time, or a temporal differential between light received at the multiple photocontrol sections across multiple times. Based on the ambient light differential, the photocontrol may identify triggering photosensor or triggering section that substantially align with a geographical orientation. The photocontrol may identify a lighting output profile. An output level of a lighting element may be modified based on the lighting output profile.

20 Claims, 5 Drawing Sheets

AUTOMATIC ORIENTATION TECHNIQUES FOR PHOTOCONTROLS OF INTELLIGENT LIGHTING FIXTURES

TECHNICAL FIELD

This disclosure relates generally to the field of intelligent lighting, and more specifically relates to orienting a photocontrol for an outdoor intelligent lighting fixture.

BACKGROUND

Intelligent lighting fixtures, such as intelligent outdoor lighting fixtures, may provide lighting output based on environmental inputs. For example, an intelligent outdoor fixture may provide lighting output based on an amount of sunlight around the intelligent outdoor fixture. In some cases, intelligent outdoor lighting fixtures are configured to provide lighting output based on a time period within a diurnal cycle, such as an intelligent outdoor fixture that is configured to reduce lighting output during late-night hours and increase lighting output near dawn or dusk. Such intelligent outdoor fixtures may offer benefits such as reduced power consumption, improved sleep and well-being for nearby residents, improved environmental benefits (such as for light-sensitive wildlife or plants), or other advantages.

In some cases, an intelligent outdoor fixture may be configured to provide lighting output within a diurnal cycle (or other time period) based on a geographical orientation of the intelligent outdoor fixture, such as by determining a dawn or dusk period based on geographical directions including north, south, east, or west. Contemporary techniques to orient an intelligent outdoor fixture may include manual orientation by a technician, such as orienting a lighting fixture or a photosensor during installation. However, manual orientation techniques may be prone to error, and could introduce water or debris into a protective housing of the lighting fixture during the orientation process or through an improperly sealed housing. In addition, a geographically-oriented lighting fixture may require recalibration due to motion of the lighting fixture or other adjustments to the geographical orientation. Manual recalibration techniques may require additional labor or effort, such as scheduling a technician to travel to the lighting fixture to perform recalibration.

SUMMARY

According to certain implementations, a lighting fixture may include a lighting element, a first photosensor, a second photosensor, and a microprocessor. The first photosensor may be configured to detect a first level of ambient light at a first section of the lighting fixture. The second photosensor may be configured to detect a second level of ambient light at a second section of the lighting fixture. The first and second sections of the photocontrol may receive various ambient light levels at various periods of a diurnal cycle. The microprocessor may be configured to determine a first instant ambient light differential between a first light level detected via the first photosensor and a second light level detected via the second photosensor. The first light level and the second light level may be detected at a first time period of the diurnal cycle. The first instant ambient light differential may be determined for the first time period. In addition, the microprocessor may be configured to determine a second instant ambient light differential between a third light level detected via the first photosensor and a fourth light level detected via the second photosensor. The third light level and the fourth light level may be detected at a second time period of the diurnal cycle. The second instant ambient light differential may be determined for the second time period. The microprocessor may be configured to calculate a temporal ambient light differential between the first section and the second section of the lighting fixture. The temporal ambient light differential may be between the first time period and the second time period. The microprocessor may be configured to determine, based on the temporal ambient light differential, a variation of ambient light levels detected via the first and second photosensors between the first and second time periods of the diurnal cycle. The microprocessor may be configured to identify, based on the variation, a triggering photosensor of the photocontrol. The triggering photosensor may be identified at one or more of the first or second photosensors. The microprocessor may be configured to modify an output level of the lighting element. Modifying the output level of the lighting element may be based on an additional ambient light level detected via the triggering photosensor.

According to certain implementations, a lighting fixture may include a color filter, a photosensor, and a microprocessor. The color filter may include multiple filter sections. Each particular filter section may be configured to admit ambient light having a particular color. Each particular filter section may receive various ambient light levels at various periods of a diurnal cycle. The photosensor may be configured to generate one or more color data signals. Each color data signal may indicate an intensity of light having the particular color admitted via the particular filter section. The microprocessor may be configured to receive, from the photosensor, a first color data signal indicating a first intensity of light having a first color admitted via a first filter section. The microprocessor may be configured to receive, from the photosensor, a second color data signal indicating a second intensity of light having a second color admitted via a second filter section. The first intensity and the second intensity may be detected at a first time period of the diurnal cycle. The microprocessor may be configured to determine a first instant ambient light differential between the first intensity of light and the second intensity of light at the first time period of the diurnal cycle. The microprocessor may be configured to receive, from the photosensor, a third color data signal indicating a third intensity of the light having the first color admitted via the first filter section. The microprocessor may be configured to receive, from the photosensor, a fourth color data signal indicating a fourth intensity of the light having the second color admitted via the second filter section. The third intensity and the fourth intensity may be detected at a second time period of the diurnal cycle. The microprocessor may be configured to determine a second instant ambient light differential between the third intensity of light and the fourth intensity of light at the second time period of the diurnal cycle. The microprocessor may be configured to calculate, based on the first and second instant ambient light differentials, a temporal ambient light differential between the first filter section and the second filter section of the lighting fixture. The temporal ambient light differential may be between the first time period and the second time period. The microprocessor may be configured to determine, based on the temporal ambient light differential, a variation of light intensities admitted via the first and second filter sections between the first and second time periods of the diurnal cycle. The microprocessor may be configured to identify a triggering section of the photocontrol based on the temporal ambient light differential. The triggering section may be identified based on a combination of the one or more color data signals of the photosensor. The microprocessor may be configured to modify an output level of a lighting element. Modifying the output level of the lighting element may be based on an additional light intensity admitted via the triggering section.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
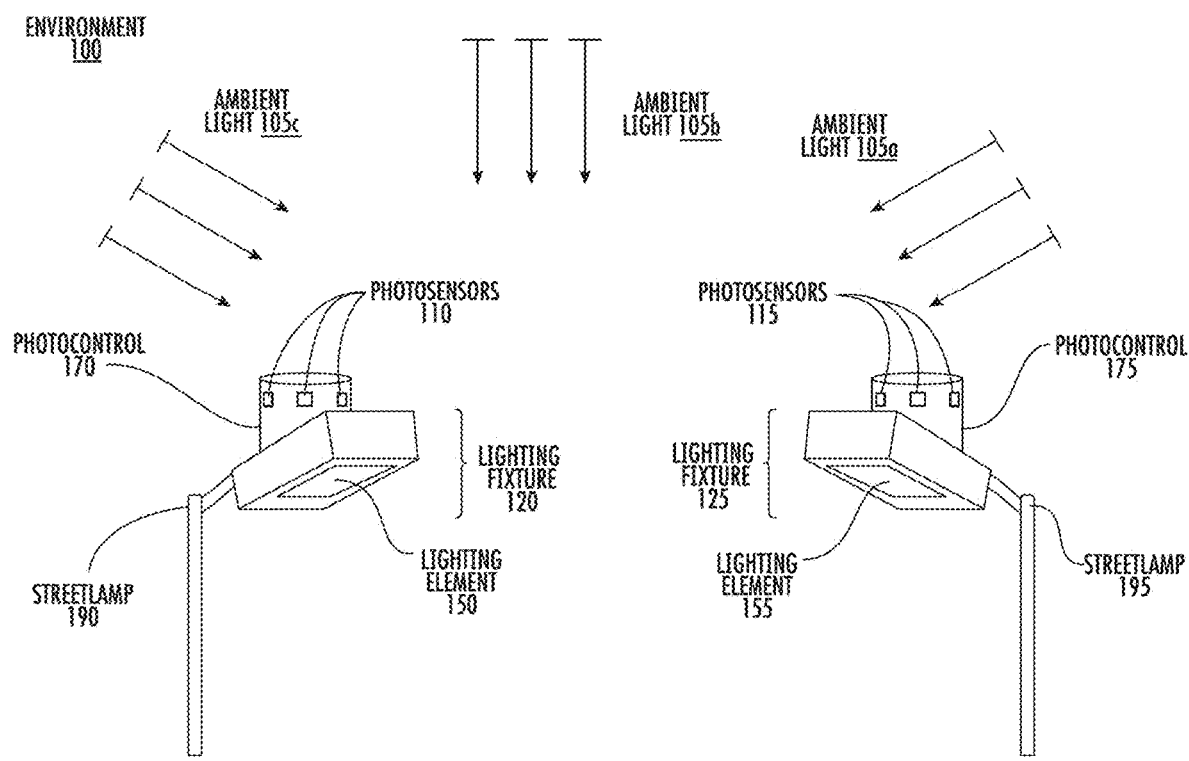
FIG. 1 is a block diagram depicting an example of an environment in which photocontrols are configured to determine a geographical orientation or a triggering photosensor, according to certain implementations.

In some implementations, certain aspects described herein provide for a photocontrol that may be configured to determine a geographical orientation. The photocontrol may be included in, mounted to, or otherwise associated with an intelligent lighting fixture. In some cases, the intelligent lighting fixture may identify a triggering photosensor that is aligned with (or has another has a relation to) the determined geographical orientation. In some cases, the intelligent lighting fixture may modify a lighting output profile based on orientation light level detected via the triggering photosensor. The lighting output profile may describe lighting output that is generated by the intelligent lighting fixture. Photocontrols that can self-orient may reduce costs or efforts related to manually orienting (including calibrating or recalibrating) a photocontrol or an intelligent lighting fixture, such as manual efforts by a lighting technician. In addition, photocontrols that can self-orient may be capable of identifying a pattern of local ambient light, such as a pattern of ambient light during a diurnal cycle or other time period. In some cases, a self-orienting photocontrol that utilizes an identified pattern of local ambient light may reduce energy consumption, such as by modifying the lighting output profile to generate lighting output based on the identified pattern. In addition, a self-orienting photocontrol that utilizes an identified pattern of local ambient light may improve sleep or well-being of nearby residents, reduce light pollution, reduce an environmental impact (such as impacts to light-sensitive wildlife or plants), or provide other benefits.

The following examples are provided to introduce certain implementations described by the present disclosure. In some implementations, a photocontrol may identify one or more of a geographical orientation or a triggering photosensor based on intensity of ambient light. The photocontrol may include multiple photosensors that receive light at multiple respective sections of the photocontrol. For example, the photocontrol may include a group of three photosensors that are each located at respective corners (or other sections) of the intelligent lighting fixture. The multiple photosensors may receive different relative amounts of ambient light during various time periods during a diurnal cycle. For example, during a morning time period, a first photosensor may receive a relatively large amount of ambient light as compared to a second photosensor. In addition, during an afternoon time period, the second photosensor may receive a relatively large amount of ambient light as compared to the first photosensor. Based on data signals indicating the respective light levels received by the photosensors, the photocontrol may determine an ambient light differential between (or among) the multiple photosensors. In addition, the photocontrol may determine variations between (or among) ambient light levels detected via the multiple photosensors during the diurnal cycle. For example, the photocontrol may determine, based on the ambient light differential, that the first photosensor receives a high intensity of ambient light during a time period (e.g., morning) prior to when the second photosensor receives a high intensity of ambient light (e.g., afternoon). Based on the ambient light differential between (or among) the multiple photosensors, the photocontrol may determine that ambient light levels detected via a particular photosensor have a least amount of variation during the diurnal cycle as compared to ambient light levels detected via additional photosensors in the photocontrol. The photocontrol may identify the particular photosensor as a triggering photosensor. In addition, an output level of a lighting element may be modified based on an additional light level detected via the triggering photosensor. In some cases, the photocontrol may identify a geographical orientation for itself or for an intelligent lighting fixture, such as a geographical orientation indicating that the triggering photosensor is located at a northern section of the photocontrol (e.g., for a photocontrol located in the Northern Hemisphere).

In some implementations, a photocontrol may identify one or more of a geographical orientation or a triggering photosensor based on color of ambient light. The photocontrol may include a particular photosensor that is configured to detect ambient light having one or more particular colors. For example, the photosensor may be configured to detect one or more of ambient light in a red color, ambient light in a blue color, or ambient light in a green color. In addition, the photocontrol may include multiple color filters, or sections of a color filter, that are arranged at multiple respective sections of the photocontrol. The multiple color filters may receive different relative amounts of ambient light during various time periods during a diurnal cycle. Based on the arrangement of the color filters, the photosensor may determine an intensity of red light at a first section of the photocontrol, an intensity of blue light at a second section of the photocontrol, or an intensity of green light at a third section of the photocontrol. In addition, the photocontrol may determine an ambient light differential between (or among) the multiple light levels received via the respective color filters. Based on data signals indicating the respective light levels received via the color filters, the photocontrol may determine an ambient light differential between (or among) the multiple light levels. In addition, the photocontrol may determine variations between (or among) ambient light levels received via the multiple color filters during the diurnal cycle. For example, the photocontrol may determine, based on the ambient light differential, that a high intensity of ambient light is received via a first color filter during a first time period of a diurnal cycle (e.g., morning) prior to an additional time period (e.g., afternoon) when a high intensity of ambient light is received via a second color filter. Based on the ambient light differential between (or among) the multiple color filters or sections of a color filter, the photocontrol may determine that ambient light intensities received via a particular color filter have a least amount of variation during the diurnal cycle as compared to ambient light intensities received via additional color filters in the photocontrol. Based on a combination of data signals indicating the respective light intensities received via the color filters, the photocontrol may identify a triggering section of the photocontrol. In addition, an output level of a lighting element may be modified based on an additional light level detected via the triggering section. In some cases, the photocontrol may identify a geographical orientation for itself or for an intelligent lighting fixture, such as a geographical orientation indicating that the triggering section is located at a northern section of the photocontrol (e.g., for a photocontrol located in the Northern Hemisphere).

Referring now to the drawings, FIG. 1 is a diagram depicting an example of an environment 100 in which one or more photocontrols are configured to determine a geographical orientation. The geographical orientation may be determined based on ambient light that is received by one or more photosensors in the photocontrols. For example, the environment 100 may include one or more of a photocontrol 170 or a photocontrol 175. The photocontrols 170 and 175 may be respectively associated with an intelligent lighting fixture 120 and an intelligent lighting fixture 125. For example, the photocontrol 170 may be mounted to a housing of the lighting fixture 120. The lighting fixture 120 may include a lighting element 150. In addition, the photocontrol 170 may include one or more photosensors, such as a group of photosensors 110. Each of the photosensors 110 may be respectively located at a particular section of the photocontrol 170. In addition, the photocontrol 175 may be mounted to a housing of the lighting fixture 125. The lighting fixture 125 may include a lighting element 155. In addition, the photocontrol 175 may include one or more additional photosensors, such as a group of photosensors 115. Each of the photosensors 115 may be respectively located at a particular section of the photocontrol 175.

FIG. 1 depicts the photosensors 110 and 115 as being located on side surfaces of the photocontrols 170 and 175, but other implementations are possible. For example, one or more additional photosensors may be located on a top surface of the photocontrols 170 or 175. Furthermore, an additional lighting fixture in the environment 100 may include a photocontrol within a housing of the additional intelligent lighting fixture, or otherwise be configured to perform operations related to self-orienting. The additional lighting fixture may include photosensors located on a top or bottom surface of the additional lighting fixture, within a protective housing of the additional lighting fixture, in a module that is external to the additional lighting fixture, or at any other suitable location or combination of locations. In some implementations, multiple photocontrols may determine a geographical orientation based on ambient light received by a particular set of photosensors, such as a group of photosensors that provide data describing light levels to multiple photocontrols.

FIG. 1 depicts each of the photocontrols 170 and 175 as including multiple photosensors 110 or 115, but other implementations are possible. For example, an additional photocontrol in the environment 100 may include a group of multiple color filter sections respectively located at particular sections of the additional photocontrol. In addition, the additional photocontrol may include a color-sensitive photosensor that is configured to receive ambient light having particular colors admitted via the multiple color filter sections of the additional photocontrol.

In some cases, the intelligent lighting fixtures 120 and 125 are outdoor intelligent lighting fixtures. For example, the lighting fixture 120 may be included in a streetlamp 190, and the lighting fixture 125 may be included in an additional streetlamp 195. In some cases, ambient light that is present in the environment 100 is received by one or more of the streetlamps 190 and 195, the lighting fixtures 120 and 125, or the photocontrols 170 and 175. In some cases, ambient light present in the environment 100 may have one or more light components that may vary based on time. For example, one or more sources of ambient light, such as ambient light 105a, ambient light 105b, or ambient light 105c (collectively referred to herein as ambient light 105) may include one or more light components that have different directions, intensities, spectra, or other characteristics of light that have variations across a diurnal cycle. For instance, the light components may vary at least partially based on a time, such as a time of day.

In some cases, one or more light components of the ambient light 105 may vary according to a time-related pattern, such as variations during a diurnal cycle. For example, the ambient light 105a may be associated with a morning time period of a diurnal cycle, and may have a direction associated with an eastern geographical direction, a wavelength spectrum associated with morning sunlight, or other light characteristics associated with the morning time period. In addition, the ambient light 105b may be associated with a midday time period of a diurnal cycle, and may have a direction associated with one or more of an overhead direction or a southern geographical direction (e.g., in the Northern Hemisphere), a wavelength spectrum associated with midday sunlight, or other light characteristics associated with the midday time period. Furthermore, the ambient light 105c may be associated with an afternoon time period of a diurnal cycle, and may have a direction associated with a western geographical direction, a wavelength spectrum associated with afternoon sunlight, or other light characteristics associated with the afternoon time period. In some cases, a particular section of the photocontrol 170 (or 175) may receive ambient light that varies less during the diurnal cycle, as compared to other sections of the photocontrol. For example, a section that generally faces north (e.g., in the Norther Hemisphere) may receive ambient light that varies the least during the diurnal cycle, as compared to other sections facing in other directions.

For convenience, and not by way of limitation, FIG. 1 depicts the ambient light 105a, 105b, and 105c as including particular light components having particular respective associated directions. However, additional light components of the ambient light 105 may be received by one or more of the photocontrols 170 or 175. For example, the ambient light 105 may include additional light components that are received from additional light sources. Additional light sources may include artificial light sources, such as additional streetlamps, vehicle headlights, decorative light fixtures (e.g., advertising signage, architectural fixtures), or other types of artificial light sources. Furthermore, additional light sources may include reflected light components, such as reflections of sunlight (or artificial light sources) from water, metal, glass, or other surfaces. In addition, the ambient light 105 may include additional light components resulting from shadows (or other absences of light) that affect light received in the environment 100. In some cases, one or more additional light components may vary according to a diurnal cycle or other time-related pattern, including time-varying reflections, shadows, or artificial light sources. For example, ambient light 105a may include one or more additional light components that are associated with a morning time period. In addition, ambient light 105b and 105c may respectively include one or more additional light components that are associated with, respectively, a midday time period and an afternoon time period.

For convenience, and not by way of limitation, the environment 100 and the ambient light 105 are described in regards to a geographical location in the Northern Hemisphere, such as a location in which the ambient light 105b may be received from a southern geographical direction. However, other scenarios are possible. For example, at a geographical location in the Southern Hemisphere, ambient light associated with a midday time period may be received from a northern geographical direction, or a photocontrol section that faces generally south may receive ambient light that varies the least during a diurnal cycle, as compared to other sections facing in other directions. In addition, at an equatorial geographical location, ambient light associated with the midday time period may be received from an overhead direction (e.g., without a strong northern or southern direction), or photocontrol sections that (respectively) face generally north and south may each receive similar amounts of ambient light that vary the least during a diurnal cycle, as compared to other sections facing in other directions.

In FIG. 1, one or more photosensors included in the photocontrols 170 or 175 may receive a particular amount of the ambient light 105. In some cases, the particular amount of ambient light may be associated with a particular section of the photocontrols 170 or 175, such as a portion of the photocontrol housing that receives the ambient light 105. In addition, the particular amount of ambient light may be associated with a particular time period, such as a time period of a diurnal cycle. For example, one or more of the photosensors 110 or 115 may detect ambient light levels based on variations of the ambient light 105 during the diurnal cycle. In some implementations, a photocontrol may determine an ambient light differential between (or among) multiple photosensors on the photocontrol, such as an instant ambient light differential or a temporal ambient light differential. In some cases, an instant ambient light differential is determined based on ambient light associated with a particular time period of a diurnal cycle, such as a time period having a particular timestamp or time range. In some cases, a temporal ambient light differential is determined based on a change of ambient light over multiple time periods during the diurnal cycle, such as multiple time periods that include, e.g., a morning time period and a midday time period. In FIG. 1, one or more ambient light differentials are described with regards to morning, midday, and afternoon time periods associated with the ambient light 105, but other implementations are possible. For example, an ambient light differential (including instant or temporal differentials) may be determined with respect to time periods or ambient light associated with evening, dawn, dusk, nighttime, pre-dawn, or other suitable time periods in the diurnal cycle.

For example, during a morning time period, a first one of the photosensors 110 located at a first section of the photocontrol 170 may receive a relatively large amount of the ambient light 105a. In addition, a second one of the photosensors 110 located at a second section of the photocontrol 170 may receive a relatively small amount of the ambient light 105a. Based on the relative amounts of the ambient light 105a received by the first and second photosensors 110, an instant ambient light differential (e.g., for the ambient light 105a) may be determined between the first and second sections of the lighting fixture 120. As a non-limiting example, if the first section of the photocontrol 170 faces generally east and the second section of the photocontrol 170 faces generally south, the first photosensor may receive a relatively large amount of the ambient light 105a as compared to the second photosensor. The instant ambient light differential may be associated with the morning time period (e.g., the ambient light 105a), such as an instant ambient light differential having a particular timestamp or time range that is included in the morning time period.

In some implementations, additional instant ambient light differentials may be determined based on relative amounts of the ambient light 105 received by the photosensors 110 during additional time periods in the diurnal cycle. In some cases, pairwise instant ambient light differentials are determined among multiple pairs of the photosensors 110, such as at one or more time periods. For example, during a midday time period a third one of the photosensors 110 located at a third section of the photocontrol 170 (e.g., a section facing generally north) may receive a relatively small amount of the ambient light 105b as compared to the first and second photosensors 110. An instant ambient light differential associated with the midday time period (e.g., the ambient light 105b) may be determined between (or among) the first, second, and third photosensors 110. In addition, during an afternoon time period a fourth one of the photosensors 110 located at a fourth section of the photocontrol 170 (e.g., a section facing generally west) may receive a relatively large amount of the ambient light 105c as compared to the first, second, or third photosensors 110. An instant ambient light differential associated with the afternoon time period (e.g., the ambient light 105c) may be determined between (or among) the first, second, third, and fourth photosensors 110. In some cases, one or more instant ambient light differentials may be determined between (or among) respective sections of the photocontrol 175, such as pairwise instant ambient light differentials determined for each pair of the photosensors 115, based on relative amounts of the ambient light 105 received by the photosensors 115 during one or more particular time periods.

In some cases, one or more of the photocontrols 170 or 175 may determine a temporal ambient light differential based on multiple instant ambient light differentials. In addition, the temporal ambient light differential may describe a change in the instant ambient light differentials calculated for a group of photosensors, such as a change over time during the diurnal cycle. In some cases, the temporal ambient light differentials are calculated for one or more pairs of photosensors, such as based on pairwise instant ambient light differentials. For example, the photocontrol 170 (or a module included therein) may determine a temporal ambient light differential based on one or more of the morning instant ambient light differential (e.g., associated with the ambient light 105a), the midday instant ambient light differential (e.g., associated with the ambient light 105b), or the afternoon instant ambient light differential (e.g., associated with the ambient light 105c). In addition, the photocontrol 170 may determine the temporal ambient light differential based on a change between the instant ambient light differentials, such as a change between the morning and midday instant differentials (or another set of the instant differentials). In some cases, the temporal ambient light differential may indicate that the first photosensor 110 (e.g., facing generally east) receives a relatively large amount of the ambient light 105 as compared to the fourth photosensor 110 (e.g., facing generally west) during the morning time period, and a relatively small amount of the ambient light 105 as compared to the fourth photosensor 110 during the afternoon time period.

In FIG. 1, one or more of the photocontrols 170 or 175 may determine a geographical orientation based on the ambient light differentials, including one or more of an instant differential or a temporal differential. In addition, one or more of the photocontrols 170 or 175 may identify a respective triggering photosensor, such as a triggering photosensor from among the photosensors 110 (or 115) for the photocontrol 170 (or 175). The triggering photosensor may be identified based on respective variations of ambient light levels that are detected by each of the photosensors, such as a particular photosensor that receives ambient light with the least variation, as compared to the other photosensors, during the diurnal cycle. For example, the photocontrol 170 may determine that the first photosensor 110 (e.g., at a section facing generally east) receives a relatively large amount of the ambient light 105 with respect to the additional photosensors 110 during a first time period and a relatively small amount of the ambient light 105 with respect to the additional photosensors 110 during a subsequent time period. Based on one or more temporal ambient light differentials across the first time period and the subsequent time period, e.g., receiving relatively large amounts of ambient light followed by relatively smaller amount of ambient light, the photocontrol 170 may determine that the ambient light levels detected via the first photosensor 110 have a large variation during the diurnal cycle. In addition, by comparing temporal ambient light differentials associated with each of the photosensors 110, the photocontrol 170 may determine that the third photosensor 110 (e.g., at a section facing generally north) receives ambient light levels having a least amount of variation between time periods of the diurnal cycle, as compared to light levels received by the other photosensors 110.

In some cases, the photocontrols 170 or 175 may identify respective triggering photosensors from among the photosensors 110 or 115. The triggering photosensor may be identified based on one or more comparisons of temporal ambient light differentials associated with pairs of the photosensors 110 (or 115). For example, by comparing the temporal ambient light differentials of the third photosensor 110 with additional temporal differentials of the other photosensors 110, the photocontrol 170 may identify the third photosensor 110 as the triggering photosensor. In some cases, the photocontrol 170 may generate data that indicates that the third photosensor 110 has a least amount of variation between ambient light levels detected during multiple time periods of the diurnal cycle.

In some implementations, a triggering photosensor may be identified as a particular photosensor that is aligned or substantially aligned with a particular direction. In addition, a triggering photosensor may be identified based on multiple photosensors. The triggering photosensor may be identified as a combination of data received from two or more photosensors, such as an average, a weighted average, or another suitable combination of data. For example, if the photocontrol 175 is installed such that two (or more) particular ones of the photosensors 115 are aligned or substantially aligned with, respectively, the directions northeast and northwest, the photocontrol 175 may identify a triggering photosensor as a combination of the two particular photosensors. In addition, the photocontrol 175 may determine ambient light detected via the triggering photosensor as a combination of ambient light detected via the two particular photosensors. In some cases, a triggering photosensor may be identified as a combination of adjacent photosensors, non-adjacent photosensors (e.g., separated by one or more additional photosensors of the photocontrol), or other suitable combinations. For example, if an intelligent lighting fixture is located in an equatorial region, a triggering photosensor may be identified as a combination of two photosensors aligned or substantially aligned with the directions north and south, or as a combination of four photosensors aligned or substantially aligned with the directions north, south, east, and west. Additional combinations of photosensors (or alignments of photosensors) suitable for a triggering photosensor may be identified.

In some cases, the photocontrol 170 may determine a geographical orientation of the photocontrol 170, such as by generating data that indicates that the third photosensor 110 faces generally north. The geographical orientation may indicate a directional orientation of the photocontrol 170, such as a direction of a particular component in the photocontrol 170 with respect to a cardinal direction (e.g., north, south, east, west). For example, the photocontrol 170 may identify that a particular one of the photosensors 110 faces generally towards a cardinal direction. In addition, the photocontrol 170 may identify that a particular one of the photosensors 110 is more closely aligned with a particular direction, e.g., north, than any additional one of the photosensors 110. Furthermore, the photocontrol 170 may identify that multiple photosensors 110 are dispersed approximately equally from a particular direction, e.g., two photosensors 110 respectively facing northwest and northeast are approximately equidistant from the direction north. In some cases, the geographical orientation may indicate an angular displacement of the photocontrol 170, such as an angular displacement from a default direction or a calculated direction, e.g., calculated from global positioning system ("GPS") coordinates.

In some implementations, an intelligent lighting fixture may modify a lighting output based on ambient light detected via the triggering photosensor. In FIG. 1, one or more of the lighting fixtures 120 or 125 may modify a lighting output of the respective lighting elements 150 or 155. For example, based on ambient light detected via the triggering photosensor, the photocontrol 170 may provide to the lighting fixture 120 data that describes an output profile, such as a lighting output profile for the lighting element 150. In addition, the lighting fixture 120 may modify a lighting output of the lighting element 150 based on the output profile or other data received from the photocontrol 170. For example, based on a lighting output profile indicating that the third one of the photosensors 110 (e.g., facing generally north) is the triggering photosensor for the photocontrol 170, the lighting fixture 120 may calculate a lighting output related to a sunset condition, such as a lighting output generated after ambient light received by the third photosensor 110 drops below a threshold. In addition, the lighting fixture 125 may calculate a lighting output for the lighting element 155 based on a lighting output profile received from the photocontrol 175. The lighting output profile may indicate that the triggering photosensor for the photocontrol 175 is a combination of the two particular photosensors (e.g., facing generally northwest and northeast). In addition, the lighting fixture 125 may calculate the lighting output based on ambient light data associated with the triggering photosensor, such as a combination of ambient light detected via the two particular photosensors.

In some implementations, a self-orienting photocontrol may determine a geographical orientation or a triggering photosensor based on data describing ambient light levels, such as data signals describing light levels received by one or more photosensors included in the self-orienting photocontrol. In addition, the self-orienting photocontrol may determine the geographical orientation or the triggering photosensor based on data describing historical ambient light levels. For example, a self-orienting photocontrol may store data describing historical levels of ambient light received by photosensors over one or more time periods. In some cases, historical ambient light data describes a pattern of ambient light received across multiple time periods, such as a pattern associated with a diurnal cycle.

In some implementations, a temporal ambient light differential may be associated with a diurnal cycle or other time-related pattern, such as a temporal differential between morning and afternoon or other suitable time periods. In addition, a temporal ambient light differential may be associated with a periodicity. For example, a photocontrol may calculate that a particular temporal ambient light differential occurs on a regular (or semi-regular) basis, such as with respect to a diurnal cycle or other time-related pattern. In some cases, the photocontrol may determine one or more of a geographical orientation or a triggering photosensor based on determining the association of the temporal ambient light differential with the diurnal cycle, periodicity, or other time-related characteristics.

Determining Geographical Orientation Using Intensity of Ambient Light

Figure 2:
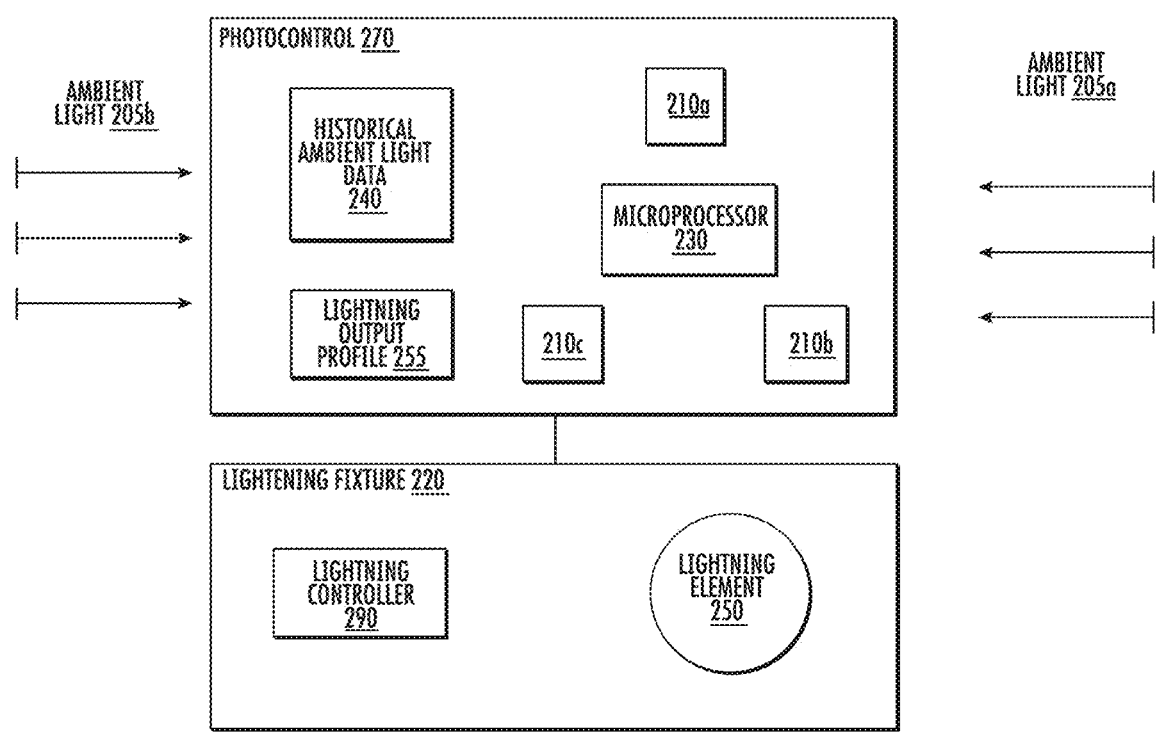
FIG. 2 is a diagram depicting an example of a photocontrol including photosensors located at sections of the photocontrol, according to certain implementations.

FIG. 2 is a diagram depicting an example of a photocontrol 270 that may be capable of identifying a triggering photosensor based on ambient light, such as variations of ambient light during a diurnal cycle. In addition, the photocontrol 270 may be capable of determining a geographical orientation based on the ambient light. The photocontrol 270 may be included in, or be in communication with, a lighting fixture 220. In some cases, the photocontrol 270 may provide data to (or receive data from) the lighting fixture 220. In addition, a lighting output of the lighting fixture 220 may be modified based on the data received from the photocontrol 270. For example, a lighting output of the lighting fixture 220 may be modified based on data from the triggering photosensor identified in the lighting profile provided by the photocontrol 270.

The lighting fixture 220 may be an intelligent lighting fixture. In addition, the lighting fixture 220 may be an outdoor lighting fixture, such as a lighting fixture included in a streetlamp or other type of outdoor structure. One or more of the photocontrol 270 or the lighting fixture 220 may receive ambient light, such as ambient light 205a or ambient light 205b (collectively referred to herein as ambient light 205). In some cases, the ambient light 205a is associated with a first time period (e.g., morning) and the ambient light 205b is associated with a second time period (e.g., afternoon). In FIG. 2, the ambient light 205 may include one or more light components with characteristics of light that are at least partially based upon a time, such as a time of day. For convenience, and not by way of limitation, FIG. 2 depicts the ambient light 205a and 205b as including particular light components having particular respective directions, but other implementations are possible. For example, the ambient light 205 may include additional light components, including additional light components that may vary according to a diurnal cycle or other time-related patterns.

The lighting fixture 220 may include a lighting element 250 that is configured to produce lighting output. In some cases, the lighting element 250 may produce lighting output according to a lighting output profile 255. In some cases, the lighting output profile 255 may describe a triggering photosensor for the lighting fixture 220. In addition, the lighting output profile 255 may describe lighting output that is based on data describing light levels received by the triggering photosensor. In addition, the lighting fixture 220 may include a lighting controller 290. The lighting controller 290 may be configured to modify a lighting output of the lighting element 250, such as by providing control signals to the lighting element 250. In some cases, the lighting controller 290 may include one or more of a ballast, a driver for light-emitting diodes ("LED"), or other components configured to control lighting output of a lighting element.

In addition, the photocontrol 270 may include a group of one or more photosensors 210. The photosensors 210 may include a photosensor 210a located at a first section of the photocontrol 270, a photosensor 210b located at a second section of the photocontrol 270, or a photosensor 210c located at a third section of the photocontrol 270. The photosensors 210 may include one or more additional photosensors located at additional sections of the lighting fixture 220. In some cases, a photocontrol that includes a relatively large number of photosensors (e.g., 5 or more photosensors) may determine a geographical orientation or a triggering photosensor with higher precision as compared to a photocontrol that includes a relatively small number of photosensors (e.g., fewer than 5 photosensors). In addition, a photocontrol that includes a relatively small number of photosensors may have a reduced use of manufacturing resources (e.g., lower cost, shorter testing) as compared to a photocontrol that includes a relatively large number of photosensors.

In some implementations, one or more of the photosensors 210 may be included in the photocontrol 270, such as a photosensor that is located within a housing or affixed to an external surface of the photocontrol 270. In addition, one or more of the photosensors 210 may have a location that is external to the photocontrol 270. In some cases, an externally located photosensor may be communicatively coupled to a photocontrol. For example, a photocontrol may be communicatively coupled with one or more externally located photosensors that are located on a surface that receives a portion of ambient light that is also received by the photocontrol. For example, the photocontrol 270 may be communicatively coupled with an externally located photosensor that is mounted to a wall (or other structure) that receives the ambient light 205 at similar times and intensities as the photocontrol 270.

In some cases, the photocontrol 270 may include one or more microprocessors, such as a microprocessor 230. In addition, the photocontrol 270 may include historical ambient light data 240, such as information stored via a data storage component (e.g., an onboard memory module, a storage portion of the microprocessor 230). In some cases, the historical ambient light data 240 may include data that describes light levels received by one or more of the photosensors 210. For example, the historical ambient light data 240 may include a first set of data values indicating light levels received by the photosensor 210a, a second set of data values indicating light levels received by the photosensor 210b, and a third set of data values indicating light levels received by the photosensor 210c. In some cases, the historical ambient light data 240 may indicate a sequence of the light levels received by the photosensors 210. For example, the historical data 240 may include time data that is associated with the data indicating light levels. In some cases, the historical data 240 may associate the light levels with a timestamp, such as a timestamp generated by an onboard clock module, a network-enabled module that can receive time information, or otherwise accessible time data. In addition, the historical data 240 may associate the light levels with one or more time periods, such as a morning time period, midday time period, afternoon time period, or any other suitable time period.

In some implementations, the historical ambient light data 240 may indicate a sequence of light levels that are detected via one or more of the photosensors 210. For example, each of the photosensors 210 may receive a portion of the ambient light 205a during the associated first time period. In addition, each of the photosensors 210 may receive a portion of the ambient light 205b during the associated second time period. The historical data 240 may indicate a sequence of the received ambient light 205, such as a first sequence of ambient light levels received by the photosensor 210a, a second sequence of ambient light levels received by the photosensor 210b, and a third sequence of ambient light levels received by the photosensor 210c.

In addition, the historical ambient light data 240 may indicate one or more ambient light differentials, such as an instant ambient light differential or a temporal ambient light differential. For example, the historical data 240 may indicate one or more historical instant ambient light differentials between historical light levels received by the photosensors 210. In some cases, multiple pairwise instant ambient light differentials may be determined for a particular time period of a diurnal cycle (e.g., a particular timestamp or range of timestamps). For example, the microprocessor 230 may determine one or more of a first instant ambient light differential between the photosensors 210a and 210b, a second instant ambient light differential between the photosensors 210a and 210c, or a third instant ambient light differential between the photosensors 210b and 210c. The first, second, and third instant ambient light differentials may be associated with a particular time or range of times during a diurnal cycle. The historical ambient light data 240 may indicate a sequence of the instant ambient light differentials at respective times (or ranges of times), such as a first set of instant ambient light differentials among each pair of the photosensors 210 at a first time, a second set of instant differentials among each pair of the photosensors 210 at a second time, or one or more additional sets of instant differentials among each pair of the photosensors 210 at respective additional times.

In FIG. 2, the microprocessor 230 may determine one or more temporal ambient light differentials, such as between time periods of the diurnal cycle. The temporal differential may be based on one or more of a current instant ambient light differential associated with a present time, a historical instant ambient light differential associated with a previous time, or combinations of multiple historical instant ambient light differentials associated with multiple previous times. For example, the microprocessor 230 may determine a set of current instant ambient light differentials among pairs of the photosensors 210 based on the ambient light 205b. In addition, the microprocessor 230 may access, such as in the historical data 240, a set of historical instant ambient light differential among pairs of the photosensors 210 based on the ambient light 205a. In some cases, the microprocessor 230 may calculate a temporal ambient light differential based on a comparison of one or more of the current instant differentials with one or more of the historical instant differentials. For example, a temporal ambient light differential may be determined for the pair of photosensors 210a and 210b based on the current instant differential and the historical instant differential for the pair of photosensors 210a and 210b. The microprocessor 230 may determine one or more additional temporal differentials, such as for the pair of photosensors 210a and 210c or the pair of photosensors 210b and 210c. In some cases, the microprocessor 230 may determine one or more additional ambient light differentials (such as instant differentials or temporal differentials) associated with one or more additional photosensors included in the lighting fixture 220. In FIG. 2, a temporal ambient light differential may indicate a change of light levels that are detected via the photosensors 210 across multiple time periods, such as changes of light levels across the time periods associated with the ambient light 205.

Based on one or more ambient light differentials, including instant differentials or temporal differentials, the photocontrol 270 may identify that one or more of the photosensors 210 is a triggering photosensor for the photocontrol 270. For instance, the photocontrol 270 may compare temporal ambient light differentials calculated for each pair of the photosensors 210. Based on the comparison, the photocontrol 270 may determine that the photosensor 210a detects ambient light levels that have a least amount of variation between time periods, as compared to ambient light levels detected by photosensors 210b or 210c. Responsive to determining that the photosensor 210a detects ambient light levels having a least amount of variation, the photocontrol 270 may create or modify data identifying the photosensor 210a as the triggering photosensor. In some implementations, the lighting controller 290 may modify lighting output of the lighting element 250, based on an additional data signal generated by the triggering photosensor. For example, if the triggering photosensor provides a signal indicating that ambient light levels have fallen below (or risen above) a threshold light level, the lighting controller 290 may control the lighting element 250 to increase (or decrease) lighting output.

In some implementations, the photocontrol 270 may identify a geographical orientation of the photocontrol 270 or one or more of the photosensors 210 based on one or more ambient light differentials, including instant differentials or temporal differentials. For example, the microprocessor 230 may determine, based on one or more temporal differentials between one or more pairs of the photosensors 210, that the photocontrol 270 has a geographical orientation in which the photosensor 210b is located at a section that faces generally southeast, the photosensor 210a is located at a section that faces generally north, and the photosensor 210c is located a section that faces generally southwest. In some cases, the geographical orientation of the photocontrol 270 may be determined based on one or more additional ambient light differentials (such as instant differentials or temporal differentials) associated with one or more additional photosensors that are respectively located at additional sections of the photocontrol 270. In some cases, the photocontrol 270 may identify the geographical orientation based on additional data indicating a location of the photocontrol 270 (e.g., coordinate data received from a GPS module, region data received during manufacturing of the photocontrol 270), such as location data indicating that the photocontrol 270 is located in the Northern Hemisphere, Southern Hemisphere, an equatorial region, etc.

In some cases, one or more of a photocontrol or an intelligent lighting fixture may identify a lighting output profile based on a triggering photosensor identified by the photocontrol. The lighting output profile may describe one or more output levels that can be produced by one or more lighting elements in the intelligent lighting fixture. For example, the photocontrol 270 may provide to the lighting fixture 220 data that describes the triggering photosensor, such as data provided via a wired or wireless communication technique. In addition, one or more of the photocontrol 270 or the lighting fixture 220 may identify the lighting output profile 255 based on the identified triggering photosensor for the photocontrol 270. In some cases, the photocontrol 270 may provide to the lighting fixture 220 data describing one or more of the triggering photosensor, light levels detected by one or more of the photosensors 210, the lighting output profile 255, the geographical orientation, or other suitable data. For example, the photocontrol 270 may generate or modify the lighting output profile 255 to include data indicating that photosensor 210a is identified as the triggering photosensor. In some cases, the lighting output profile 255 may describe output levels of the lighting element 250, such as output levels based on one or more ambient light levels detected via the triggering photosensor. For example, the lighting output profile 255 may indicate that the lighting element 250 produces a first output level responsive to determining a light level received by a photosensor generally facing west (e.g., photosensor 210c). Based on the lighting output profile 255, the lighting element 250 may produce the first output level responsive to determining that the triggering photosensor detects a light level below a light level threshold, e.g., increasing lighting output when the afternoon (e.g., western) ambient light 205b has dropped below an evening threshold. In addition, based on the profile 255, the lighting element 250 may produce a second output level responsive to determining that the triggering photosensor detects a light level above a light level threshold, e.g., decreasing lighting output when the morning (e.g., eastern) ambient light 205a has risen below a morning threshold.

In some cases, the lighting output profile 255 may indicate an output level of the lighting element 250 based on additional information. For instance, based on time data indicating that a quantity of time (e.g., two hours) has elapsed since the ambient light level of the triggering photosensor dropped below the evening light level threshold, the lighting element 250 may produce a third output level. In some cases, the lighting output profile 255 may describe multiple light outputs based on the additional information, such as increasing light output to about 100% at dusk (e.g., first output level), reducing light output to about 50% during late evening and early morning hours (e.g., third output level), and reducing light output to about 0% at dawn (e.g., second output level). In some cases, lighting profiles with multiple light outputs may improve energy efficiency of the lighting fixture 220 or well-being of nearby residents, such as by reducing interference with sleeping patterns of people. In some cases, the lighting fixture 220 may modify an output level of the lighting element 250 based on one or more of the lighting output profile 255, ambient light detected via the triggering photosensor (e.g., individual photosensor, combinations of photosensors), an instant ambient light differential, a temporal ambient light differential, an additional light level detected via one or more of the photosensors 210, or additional suitable data.

In some implementations, the photocontrol 270 may determine a diurnal cycle associated with one or more temporal ambient light differentials. For example, the microprocessor 230 may identify that the pair of photosensors 210a and 210b has an increasing temporal differential, such as by identifying that the photosensors 210a and 210b have a small instant differential (e.g., receive similar amounts of the ambient light 205a) during the morning time period and have a large instant differential (e.g., receive different amounts of the ambient light 205b) during the afternoon time period. In addition, the microprocessor 230 may identify that the pair of photosensors 210a and 210c has a decreasing temporal differential, such as by identifying that the photosensors 210a and 210c have a large instant differential (e.g., receive different amounts of the ambient light 210a) during the morning and have a small instant differential (e.g., receive similar amounts of the ambient light 205b) during the afternoon. In addition, the microprocessor 230 may identify that the pair of photosensors 210b and 210c has a distributed temporal differential, such as by identifying that the photosensors 210b and 210c have approximately similar instant differentials during the morning and afternoon (e.g., photosensor 210b receives a larger amount of light during the morning, photosensor 210c receives a larger amount of light during the afternoon). In some cases, the photocontrol 270 may store instant or temporal ambient light differentials as numeric data, such as an absolute value of a difference between light levels detected via photosensors (e.g., differences between light levels at a particular time period, differences between light levels at multiple time periods).

In some cases, the microprocessor 230 may determine a diurnal cycle associated with the ambient light 205, such as based on one or more temporal ambient light differentials or other suitable data describing changes of the ambient light 405 received by the photosensors 210. The diurnal cycle may be determined based on comparisons of temporal differentials. For example, the microprocessor 230 may determine that a temporal ambient light differential occurs daily e.g., once per diurnal cycle, based on a comparison of historic temporal differentials. In addition, the microprocessor may determine a diurnal cycle based on relationships between ambient light differentials, such as a temporal differential that decreases from morning to midday (e.g., photosensors receive approximately equal ambient light at midday) or increases from midday to evening (e.g., west-facing sensors receive a larger portion of light in the evening as compared to east-facing sensors). In addition, the microprocessor 230 may identify a geographical orientation of the lighting fixture 220 responsive to determining a diurnal cycle associated with a temporal ambient light differential, such as by identifying a direction (e.g., east, west) based on a determined diurnal cycle.

In some cases, the photocontrol 270 may determine a periodicity associated with one or more temporal ambient lights differentials. The periodicity may be associated with, for example, a diurnal cycle, a portion of a diurnal cycle, multiple diurnal cycles, or any other suitable time period. For example, the microprocessor 230 may identify that an ambient light level detected via the triggering photosensor of the photosensors 210 has a daily periodicity, such as a periodicity from light components that occur daily (e.g., sunlight). In addition, the microprocessor 230 may identify that a temporal ambient light differential between a pair of the photosensors 210 has a periodicity. Furthermore, the microprocessor 230 may identify that a periodicity may be greater or less than a day, such as a periodicity from light components that vary over longer or shorter periods of time (e.g., weather patterns, seasonal variations of sunset/sunrise times).

In some implementations, one or more of the triggering photosensor or the geographical orientation of the photocontrol 270 may be identified based on one or more relative locations of the photosensors 210. For example, the microprocessor 230 may include location data describing a respective location of one or more of the photosensors 210. The location data may describe the respective location of each photosensor 210 with regards to the photocontrol 270, with regards to an additional one of the photosensors 210, or via additional suitable location data. For example, the microprocessor 230 may include location data describing an angular separation between (or among) sections of the photocontrol 270 where the photosensors 210 are located. In addition, the microprocessor 230 may include location data describing a distance between (or among) the sections of the photocontrol where the photosensors 210 are located. As a non-limiting example, the location data for the photocontrol 270 may indicate that each pair of the photosensors 210 has an angular separation of approximately 120°, a distance (e.g., between the photosensors) of approximately 4 cm, or additional suitable location data describing sections of the photocontrol 270. In addition, the microprocessor 230 may determine the triggering photosensor or the geographical orientation of the photocontrol 270 based on one or more of the relative locations of the photosensors 210, such as the angular separations or distances among the photosensors 210. In FIG. 2, the photosensors 210 are described with regards to two-dimensional location data, but other implementations are possible. For example, a photocontrol may include location data that describes a three-dimensional location of a photosensor, such as photosensors that have locations on a curved surface (or other structure) of the photocontrol.

Figure 3:
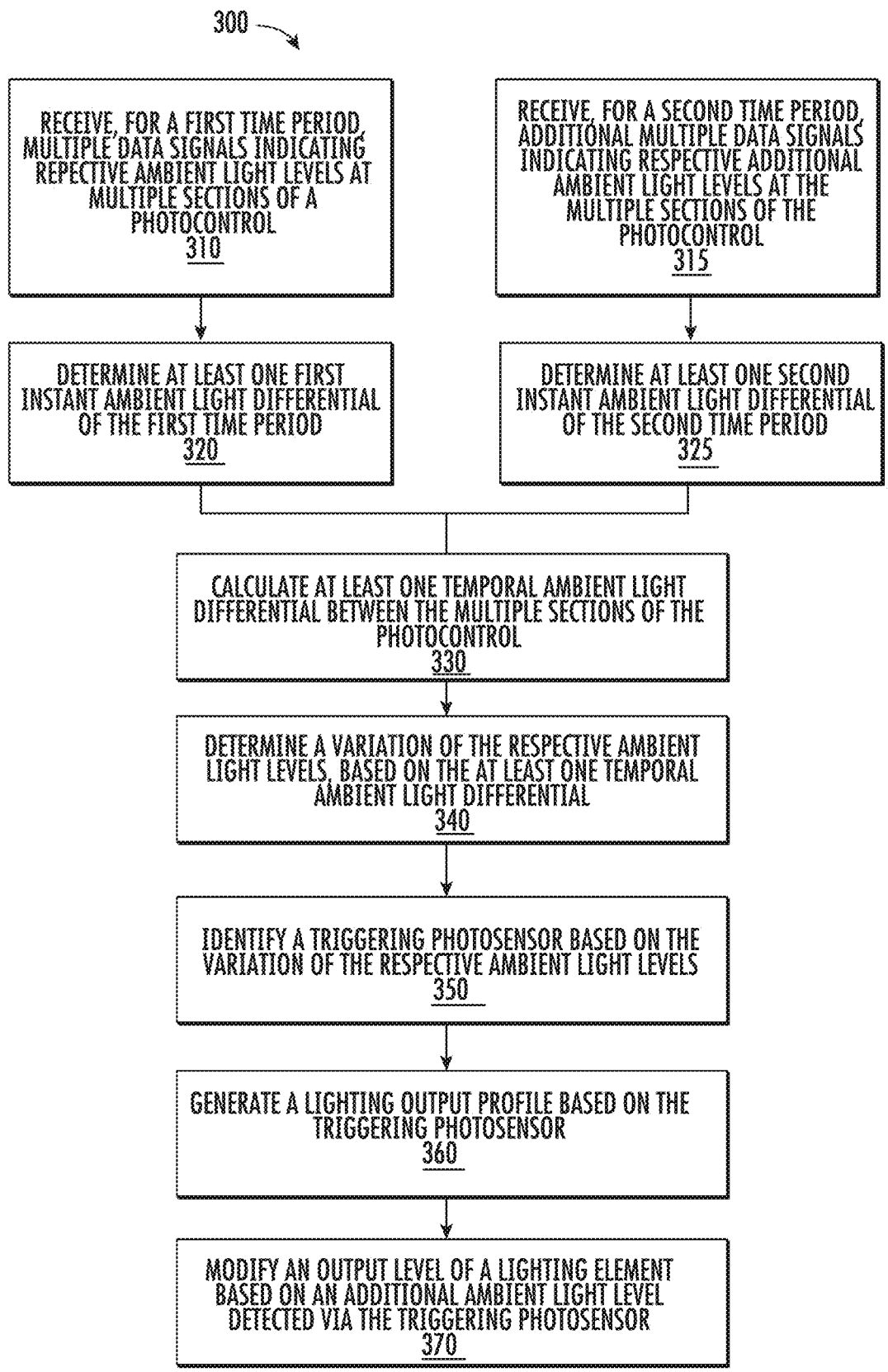
FIG. 3 is a flow chart depicting an example of a process for identifying a triggering photosensor or geographical orientation of a photocontrol based on levels of ambient light received by photosensors in the photocontrol, according to certain implementations.

FIG. 3 is a flowchart depicting an example of a process 300 for identifying one or more of a triggering photosensor or a geographical orientation of a photocontrol, such as a photocontrol mounted on (or otherwise associated with) an outdoor intelligent lighting fixture. In the process 300, the triggering photosensor may be identified based on a variation of ambient light levels received by a particular photosensor in the photocontrol. In some implementations, such as described in regards to FIGS. 1-2, a microprocessor (or other computing device) included in a photocontrol implements operations described in FIG. 3, by executing suitable program code. For illustrative purposes, the process 300 is described with reference to the examples depicted in FIGS. 1-2. Other implementations, however, are possible.

At block 310, the process 300 may involve receiving one or more data signals that indicate respective ambient light levels, such as ambient light levels at a first time period of a diurnal cycle. In some cases, the respective ambient light levels are detected via respective photosensors included in (or otherwise associated with) the photocontrol. In some cases, the one or more data signals may be associated with multiple sections of the photocontrol, such as a first data signal from a first photosensor at a first section of the photocontrol and a second data signal from a second photosensor at a second section. In addition, each of the one or more data signals may indicate a respective level of ambient light that is received by a respective photosensor at a respective section of the photocontrol. For example, the microprocessor 230 may receive a first data signal from the photosensor 210a, the first data signal indicating a first level of the ambient light 205 that is detected via the photosensor 210a, a second data signal from the photosensor 210b, the second data signal indicating a second level of the ambient light 205 that is detected via the photosensor 210b, and a third data signal from the photosensor 210c, the third data signal indicating a third level of the ambient light 205 that is detected via the photosensor 210c.

In some cases, one or more of the multiple data signals are associated with a first time period, such as a time period associated with a diurnal cycle. In addition, one or more of the multiple data signals or the first time period may be associated with a portion of ambient light received by the photocontrol. For example, one or more of the first, second, or third data signals may be associated with a first time period (e.g., a timestamp, a range of times) of the ambient light 205a received by the photocontrol 270. In addition, the first, second, and third data signals may indicate respective portions of the ambient light 205a detected via the photosensors 210a, 210b, and 210c at the first time period of the diurnal cycle.

A photocontrol may receive multiple data signals from a particular photosensor, such as multiple data signals for multiple time periods. At block 315, the process 300 may involve receiving one or more additional data signals that indicate respective additional ambient light levels, such as ambient light levels at a second time period of the diurnal cycle. In some cases, the respective additional ambient light levels are detected via the respective photosensors at the respective sections of the photocontrol. For example, the microprocessor 230 may receive a fourth data signal from the photosensor 210a indicating a fourth level of the ambient light 205 detected via the photosensor 210a, a fifth data signal from the photosensor 210b indicating a fifth level of the ambient light 205 detected via the photosensor 210b, and a sixth data signal from the photosensor 210c indicating a sixth level of the ambient light 205 detected via the photosensor 210c.

In some cases, one or more of the additional data signals are associated with a second time period, such as a time period associated with the diurnal cycle. In addition, one or more of the additional multiple data signals or the second time period may be associated with an additional portion of ambient light received by the photocontrol. For example, one or more of the fourth, fifth, or sixth data signals may be associated with a second time period (e.g., a timestamp, a range of times) of the ambient light 205b received by the photocontrol 270. In addition, the fourth, fifth, and sixth data signals may indicate respective additional portions of the ambient light 205b detected via the photosensors 210a, 210b, and 210c at the second time period of the diurnal cycle.

In some implementations, photosensors may generate data signals describing multiple light levels at a particular time, such as the first, second, and third data signals associated with the ambient light 205a, as described in regards to block 310. In addition, the photosensors may generate additional data signals describing multiple light levels at additional times, such as the fourth, fifth, and sixth data signals associated with the ambient light 205b, as described in regards to block 315. A photocontrol may compare data signals from a particular photosensor at multiple times, or data signals from multiple photosensors at a particular time, or data signals from multiple photosensors at multiple times.

Based on the data signals, the photocontrol may calculate ambient light differentials, including instant or temporal differentials.

At block 320, the process 300 may involve determining at least one first ambient light differential associated with the first time period, such as pairwise instant ambient light differentials between ambient light levels detected via the multiple photosensors at the first time period of the diurnal cycle. For example, first pairwise instant ambient light differentials for the first time period may be determined between each pair of the first ambient light level, the second ambient light level, and the third ambient light level, e.g., respectively indicated by the first, second, and third data signals. In addition, each of the first pairwise ambient light differentials may include data indicating a difference of values for the respective pair of ambient light levels detected via the multiple photosensors at the first time period. For example, the microprocessor 230 may determine a pairwise instant ambient light differential based on the first and second data signals received from the photosensors 210a and 210b, another pairwise instant ambient light differential based on the first and third data signals received from the photosensors 210a and 210c, and yet another pairwise instant ambient light differential based on the second and third data signals received from the photosensors 210b and 210c. In addition, the first pairwise instant ambient light differentials may indicate respective differences between multiple portions of the ambient light 205a detected at the first time period via the photosensors 210a, 210b, and 210c.

At block 325, the process 300 may involve determining at least one second ambient light differential associated with the second time period, such as pairwise instant ambient light differentials. For example, second pairwise instant ambient light differentials for the second time period may be determined between each pair of the fourth ambient light level, the fifth ambient light level, and the sixth ambient light level, e.g., respectively indicated by the fourth, fifth, and sixth data signals. In addition, each of the second pairwise ambient light differentials may include data indicating a difference of values for the respective pair of ambient light levels detected via the multiple photosensors at the second time period. For example, the microprocessor 230 may determine a pairwise instant ambient light differential based on the fourth and fifth data signals received from the photosensors 210a and 210b, another pairwise instant ambient light differential based on the fourth and sixth data signals received from the photosensors 210a and 210c, and yet another pairwise instant ambient light differential based on the fifth and sixth data signals received from the photosensors 210b and 210c. In addition, the second pairwise instant ambient light differential may indicate respective differences between multiple portions of the ambient light 205b detected at the second time period via the photosensors 210a, 210b, and 210c.

In some implementations, one or more of the instant ambient light differentials may be determined based on current data, such as a data signal received from a photosensor indicating an ambient light level currently received by the photosensor. In addition, one or more of the instant ambient light differentials may be determined based on historical data, such as stored data indicating a data signal received from a photosensor at a previous time. In some cases, an instant or temporal ambient light differential may, but need not, be determined based on current data. For example, a photocontrol may calculate an instant or temporal ambient light differential associated with a particular time period, such as morning, during an additional time period, such as during the afternoon or a subsequent day.

At block 330, the process 300 may involve calculating one or more temporal ambient light differentials. In some cases, each calculated temporal ambient light differential may be associated with multiple sections of the photocontrol, such as the sections where the multiple photosensors are located. For example, a first temporal differential may be calculated between the first section where the first photosensor is located and the second section where the second photosensor is located, a second temporal differential between the first section and the third section, and a third temporal differential between the second section and the third section. In addition, each calculated temporal ambient light differential may be based on one or more pairwise instant ambient light differentials. For example, the photocontrol 270 may calculate a first temporal ambient light differential between the first section and the second section, based on the pairwise instant ambient light differentials for the photosensors 210a and 210b at the first and second time periods of the diurnal cycle. In addition, the photocontrol 270 may calculate a second temporal differential between the first section and the third section, based on the pairwise instant differentials for the photosensors 210a and 210c at the first and second time periods. The photocontrol 270 may also calculate a third temporal differential between the second section and the third section, based on the pairwise instant differentials for the photosensors 210b and 210c at the first and second time periods.

In some implementations, the microprocessor 230 may identify one or more of the first or second instant ambient light differentials as a current instant ambient light differential. In addition, the microprocessor 230 may identify one or more of the first or second instant ambient light differentials as a historical instant ambient light differential, such as a historical instant differential included in the historical ambient light data 240. The microprocessor 230 may calculate the temporal ambient light differential based on a difference (or other comparison) of the current and historical instant ambient light differentials.

In some cases, each temporal ambient light differential may indicate a difference of values between (or among) one or more pairs of data signals indicating ambient light levels received by the multiple photosensors. In addition, each temporal ambient light differential may indicate a difference of values across multiple times associated with the data signals, such as the first or second time periods. For example, the microprocessor 230 may calculate the first temporal ambient light differential by determining a difference (or other suitable comparison) of ambient light levels received by the photosensors 210a and 210b at time periods respectively associated with the ambient light 205a and 205b. In some cases, a photocontrol may calculate a temporal ambient light differential having multiple light components, such as a component indicating a difference of values across a morning time and midday time and an additional difference of values across a morning time and evening time (or other suitable combinations of times).

At block 340, the process 300 may involve determining a variation of the respective ambient light levels received at the multiple sections of the photocontrol. The variation may be determined based on at least one temporal ambient light differential. In addition, the variation may be determined between (or among) ambient light levels detected by at least one of the photosensors across multiple time periods. For example, the photocontrol 270 may compare temporal ambient light differentials between each pair of the photosensors

210*a*, 210*b*, and 210*c*. Based on the comparison, the photocontrol 270 may determine whether a particular one of the photosensors 210 detects ambient light levels that vary more or less during a diurnal cycle, as compared to levels detected by the other photosensors 210. For instance, the photocontrol 270 may determine that a particular photosensor, e.g., 210*a*, detects ambient light levels that have a particular variation between time periods, e.g., as light levels change between morning and afternoon. In addition, the photocontrol 270 may determine that the ambient light levels detected by photosensor 210*a* vary less across the time periods as compared to ambient light levels detected by the photosensors 210*b* or 210*c*.

At block 350, the process 300 may involve identifying a triggering photosensor of the photocontrol. The triggering photosensor may be identified based on the temporal ambient light differential. For example, based on the one or more temporal ambient light differentials, the photocontrol may identify the triggering photosensor as a particular photosensor that detects ambient light levels that vary the least. In some cases, the triggering photosensor may be identified as a combination of two or more photosensors, such as multiple photosensors that detect ambient light levels with similar amounts of variation. For example, responsive to determining that the photosensor 210*a* detects ambient light levels with least variation compared to the other photosensors 210, the microprocessor 230 may identify the photosensor 210*a* as the triggering photosensor of the photocontrol 270. In some cases, the triggering photosensor may be identified as a combination of multiple photosensors, such as a pair of photosensors that detect ambient light levels with similar amounts of variation. In addition, a diurnal cycle may be calculated based on the temporal ambient light differential, such as a diurnal cycle indicated by one or more ambient light differentials included in the historical ambient light data 240.

In some implementations, the photocontrol may identify a geographical orientation based on the triggering photosensor or one or more temporal ambient light differentials. The geographical orientation may indicate a relative orientation of the photocontrol with respect to a direction (e.g., north, south, east, west), a coordinate system (e.g., latitude/longitude), or any suitable orientation system. For example, the photocontrol 270 may determine that the photosensor 210*b* faces generally east, e.g., based on ambient light differentials indicating that the photosensor 210*b* receives more ambient light early in a diurnal cycle. In some cases, the geographical orientation may indicate a relative orientation of the photocontrol with respect to an additional photocontrol (or other suitable component of an intelligent lighting network). For example, the lighting fixture 120 may identify a geographical orientation of the photocontrol 170 with respect to the photocontrol 175.

At block 360, the process 300 may involve generating or modifying a lighting output profile, such as a lighting output profile for a lighting element included in the intelligent lighting fixture. In some cases, the lighting output profile may be generated or modified based on the triggering photosensor. For example, the lighting output profile may indicate that a particular photosensor (or combination of photosensors) is the triggering photosensor. In addition, the lighting output profile may describe one or more sets of output levels for the lighting element. In some cases, the lighting output profile includes at least one output level that is determined based on an additional light level detected via the triggering photosensor. For example, the microprocessor 230 may modify the lighting output profile 255 responsive to determining that the photosensor 210*a* is the triggering photosensor for the photocontrol 270. Based on the triggering photosensor indicated by the profile 255, the photocontrol 270 may provide to the lighting fixture 220 a data signal describing ambient light levels detected by the triggering photosensor. In addition, the lighting controller 290 may control the lighting element 250 based on the data signal from the triggering photosensor, such as by increasing (or decreasing) lighting output if the detected ambient light levels are below (or above) a threshold level. The photocontrol 270 may provide to the lighting fixture 220 one or more of the lighting profile 255, a data signal associated with the triggering photosensor, orientation data identifying the triggering photosensor, or other suitable data. In some cases, the orientation data may indicate a geographical direction with respect to the photocontrol 270. In addition, the orientation data may indicate a relative position of the photocontrol 270 with respect to the lighting fixture 220.

In some implementations, the lighting output profile 255 may include a set of output levels for the lighting element 250. In addition, at least one of the output levels in the lighting output profile 255 may be determined based on one or more of a light level detected via the triggering photosensor, a geographical orientation of the photocontrol 270, or other data received from the photocontrol 270. For instance, the lighting controller 290 may be configured to modify output of the lighting element 250 based on the output profile 255. The lighting controller 290 may increase output of the lighting element 250 responsive to determining that the triggering photosensor detects light levels below a threshold value, e.g., an evening threshold. In addition, to the lighting controller 290 may decrease output of the lighting element 250 responsive to determining that the triggering photosensor detects light levels above an additional threshold value, e.g., a morning threshold.

At block 370, the process 300 may involve modifying one or more output levels of one or more lighting elements included in the intelligent lighting fixture to which the photocontrol is mounted. The output level may be modified based on the lighting output profile. For example, output of the lighting element 250 may be modified based on the lighting output profile 255. In some cases, the output of the lighting element is modified responsive to one or more output levels determined based on ambient light levels detected via a triggering photosensor, such as described in regards to block 360.

In some implementations, operations related to one or more blocks of the process 300 may be repeated. For example, operations related to one or more of blocks 310 or 315 may be repeated, such as for various time periods associated with respective ambient light (e.g., morning, midday, afternoon, evening). In addition, operations related to one or more of blocks 320, 325, or 330 may be repeated, such as to calculate instant or temporal ambient light differentials based on updated ambient light level data. Furthermore, operations related to one or more of blocks 340, 350, or 360 may be repeated, such as to recalibrate the identified triggering photosensor of the photocontrol.

Determining Geographical Orientation Using Color of Ambient Light

In some implementations, a photocontrol includes one or more photosensors that are configured to detect ambient light having one or more particular colors. In some cases, a particular photosensor is configured to detect light components having one or more of a red color, a blue color, a green color, or a white color. Ambient light having a red color, for example, may include one or more light components having a wavelength spectrum associated with the color red, e.g., about 620 nm to about 700 nm. In addition, ambient light having a blue color may include one or more light components having a wavelength spectrum associated with the color blue, e.g., about 430 nm to about 500 nm. Further, ambient light having a green color may include one or more light components having a wavelength spectrum associated with the color green, e.g., about 520 nm to about 570 nm. In addition, ambient light having a white color may include a combination of one or more light components having a combined wavelength spectrum associated with the color white.

Figure 4:
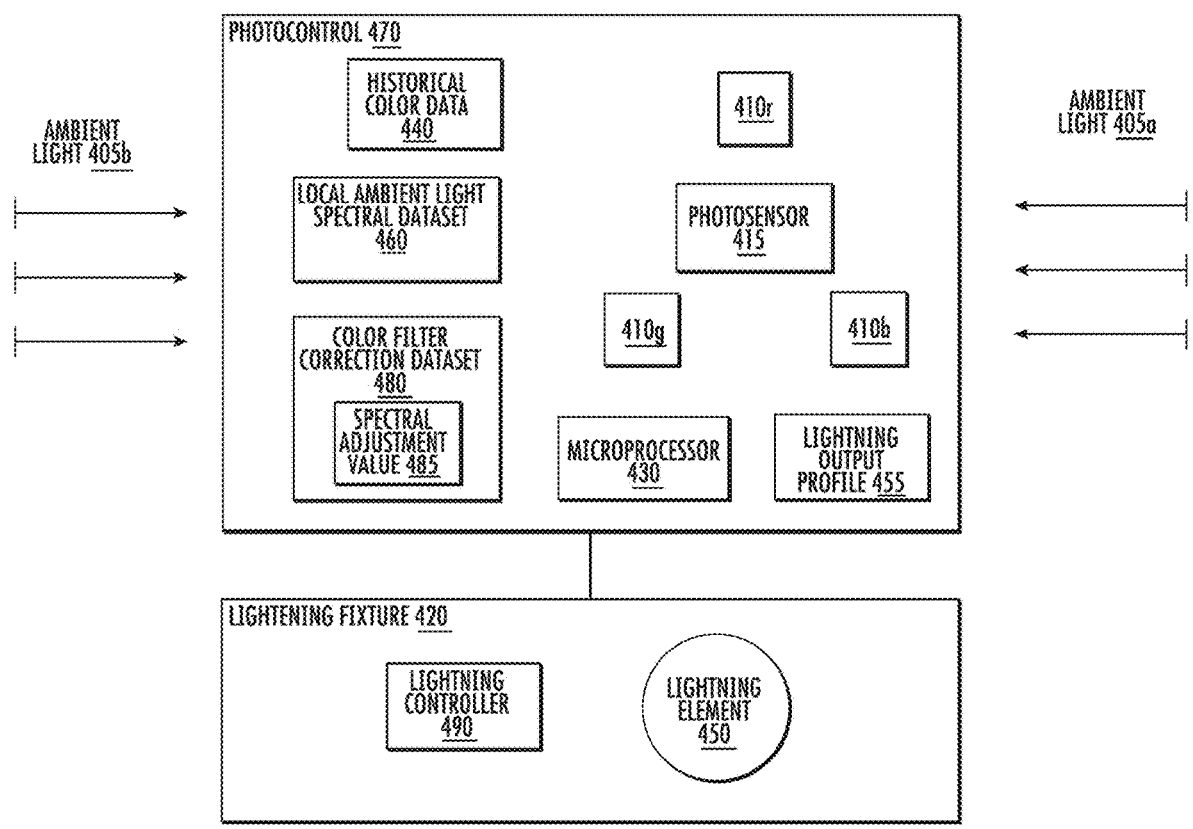
FIG. 4 is a diagram depicting an example of a photocontrol including a color filter having filter sections located at sections of the photocontrol, according to certain implementations.

FIG. 4 is a diagram depicting an example of a photocontrol 470 that may be capable of identifying a triggering section of a color filter based on ambient light, such as variations of ambient light with respective colors during a diurnal cycle. In addition, the photocontrol 470 may be capable of determining a geographical orientation based on the ambient light. The photocontrol 470 may be included in, or be in communication with, a lighting fixture 420. In some cases, the photocontrol 470 may provide data to (or receive data from) the lighting fixture 420. In addition, a lighting output of the lighting fixture 420 may be modified based on the data received from the photocontrol 470. For example, a lighting output of the lighting fixture 420 may be modified based on data describing ambient light admitted via the triggering section identified in the lighting profile provided by the photocontrol 470.

The lighting fixture 420 may be an intelligent lighting fixture. In addition, the lighting fixture 420 may be an outdoor lighting fixture, such as a lighting fixture included in a streetlamp or other type of outdoor structure. One or more of the photocontrol 470 or the lighting fixture 420 may receive ambient light, such as ambient light 405a or ambient light 405b (collectively referred to herein as ambient light 405). In some cases, the ambient light 405a is associated with a first time period (e.g., morning) and the ambient light 405b is associated with a second time period (e.g., afternoon). In FIG. 4, the ambient light 405 may include one or more light components with characteristics of light, such as color characteristics, that are at least partially based upon a time, such as a time of day. For convenience, and not by way of limitation, FIG. 4 depicts the ambient light 405a and 405b as including particular light components having particular respective directions, but other implementations are possible. For example, the ambient light 405 may include additional light components, including additional light components that may vary according to a diurnal cycle or other time-related patterns. In some cases, the ambient light 205 may include one or more light components having color characteristics that may vary according to a diurnal cycle or other time-related patterns.

The lighting fixture 420 may include a lighting element 450 that is configured to produce lighting output. In some cases, the lighting element 450 may produce lighting output according to a lighting output profile 455. In some cases, the lighting output profile 455 may describe a triggering photosensor for the lighting fixture 420. In addition, the lighting output profile 455 may describe lighting output that is based on data describing light levels admitted via the triggering section. In addition, the lighting fixture 420 may include a lighting controller 490. The lighting controller 490 may be configured to modify a lighting output of the lighting element 450, such as by providing control signals to the lighting element 450. In some cases, the lighting controller 490 may include one or more of a ballast, a LED driver, or other components configured to control lighting output of a lighting element.

In addition, the photocontrol 470 may include, or be configured to receive light via, a color filter having one or more filter sections 410. The filter sections 410 may include one or more of a filter section 410r, a filter section 410b, or a filter section 410g. In some cases, the filter section 410r may be located at a first section of the photocontrol 470, the filter section 410b may be located at a second section of the photocontrol 470, and the filter section 410g may be located at a third section of the photocontrol 470. In addition, multiple ones of the filter sections 410 may be located at a particular section of the photocontrol 470.

In some implementations, one or more of the filter sections 410 may be configured to admit light components having a particular color, such as filter sections configured via coloring, tinting, polarization, or other any other configuration suitable to filter light component based on a color characteristic. The filter section 410r may be configured to admit ambient light (or light component) having a red color. The filter section 410b may be configured to admit ambient light (or light component) having a blue color. The filter section 410g may be configured to admit ambient light (or light component) having a green color. FIG. 4 is depicted as including the filter sections 410 configured to admit ambient light having red, blue, or green color characteristics, but other implementations are possible, such as a photocontrol having filter sections configured to admit light having one or more additional color characteristics (e.g., other than red, blue, or green).

The photocontrol 470 may include at least one photosensor, such as a photosensor 415. In some implementations, the photosensor 415 may be configured to receive the ambient light 405 via one or more of the filter sections 410. In addition, the photosensor 415 may be configured to provide data describing levels of light components having one or more particular colors. For example, the photosensor 415 may generate one or more color data signals indicating an intensity of ambient light having a particular color. In some cases, the photosensor 415 may generate multiple color data signals each describing a respective intensity of ambient light having a respective color, e.g., a red color data signal, a blue color data signal, a green color data signal. In addition, the photosensor 415 may generate a particular color data signal that describes multiple intensities of ambient light having particular respective colors, e.g., a red-green-blue ("RGB") color data signal. FIG. 4 depicts the photocontrol 470 as having the particular photosensor 415, but other implementations are possible. For example, a photocontrol may include multiple photosensors that are respectively configured to generate data indicating intensities of light having respective colors, such as a first photosensor for red ambient light, a second photosensor for blue ambient light, or a third photosensor for green ambient light. In some cases, one or more photosensors configured for a particular color may be located at a particular section of the intelligent lighting fixture, such as a red photosensor at a first section, a blue photosensor at a second section, or a green photosensor at a third section.

In some cases, a photocontrol may be communicatively coupled with one or more externally located photosensors that are configured to determine intensities of ambient light having respective colors, such as an externally located photosensor that is mounted to a wall (or other structure) that receives the ambient light 405 at similar times in intensities as the photocontrol 470. In addition, one or more filter sections may be externally located with respect to a photocontrol, such as a filter section that is located on a surface that receives a portion of ambient light that is also received by the photocontrol, the filter section configured to admit (e.g., to a photosensor) the portion of ambient light having a particular color characteristic.

In some cases, the photocontrol 470 may include one or more microprocessors, such as a microprocessor 430. In addition, the photocontrol 470 may include historical color data 440, such as information stored via a data storage component. In some cases, the historical color data 440 may include data that describes intensities of light received via one or more of the filter sections 410, such as intensities of light having one or more particular color characteristics. In some cases, the historical color data 440 describes color data signals generated by the photosensor 415. For example, historical color data 440 may include data values describing a first set of color data signals indicating an intensity of light admitted via the filter section 410r, a second set of color data signals indicating an intensity of light admitted via the filter section 410b, and a third set of color data signals indicating an intensity of light admitted by the filter section 410g. In some cases, the historical color data 440 may indicate a sequence of the intensities of colored light (e.g., light with color characteristics) received by the photosensor 415. For example, the historical color data 440 may include time data that is associated with the color data indicating the intensities of colored light. In some cases, the historical color data 440 may associate the intensities of colored light with a timestamp. In addition, the historical color data 440 may associate the intensities of colored light with one or more time periods, such as morning, midday, afternoon, or other suitable time periods.

In some implementations, the historical color data 440 may indicate a sequence of colored light intensities that are detected via the photosensor 415. For example, the photosensor 415 may receive a portion of the ambient light 405a during the associated first time period. The photosensor 415 may receive the portion of the ambient light 405a via one or more of the filter sections 410, such as via the filter sections 410r and 410b, during the first time period (e.g., morning). In addition, the photosensor 415 may receive a portion of the ambient light 405b during the associated second time period. The photosensor 415 may receive the portion of the ambient light 405b via one or more of the filter sections 410, such as via the filter sections 410r and 410c, during the first time period (e.g., afternoon). The historical color data 440 may indicate a sequence of the received ambient light 405, such as a first sequence of ambient light intensities received via the filter section 410r, a second sequence of ambient light intensities received via the filter section 410b, and a third sequence of ambient light intensities received via the filter section 410g. In addition, the historical color data 440 may indicate a color characteristic of the light intensities, such as the first sequence of ambient light intensities having the color red, the second sequence of ambient light intensities having the color blue, and the third sequence of ambient light intensities having the color green.

In some implementations, the photocontrol 470 determines one or more spectral patterns of local ambient light, such as the ambient light 405. A spectral pattern may describe one or more ambient light components having spectral content (or other characteristics of a wavelength spectrum) that are associated with a diurnal cycle or other time-related pattern. In some cases, a local ambient light spectral pattern describes a color (e.g., wavelength spectrum) that is associated with ambient light received during a particular time period. In some implementations, the photocontrol 470 includes a local ambient light spectral dataset 460. In addition, the local ambient light spectral dataset 460 may include one or more data values indicating spectral content of ambient light that is admitted via the filter sections 410. In some cases, the local ambient light spectral dataset 460 may describe spectral content that is associated with one or more of a time period, an intensity of colored light, or a combined intensity of light (e.g., multiple colored light components admitted via a combination of the filter sections 410).

For example, the microprocessor 430 may determine spectral content (e.g., wavelength or range of wavelengths) of the ambient light 405 based on a relative intensity of ambient light components admitted via one or more of the filter sections 410. In addition, the microprocessor 430 may determine a combined intensity of the ambient light 405 that is admitted via the filter sections 410, e.g., a combined intensity of ambient light received by the photosensor 415. Further, the microprocessor 430 may determine that the combined intensity is associated with one or more time periods. For example, the combined intensity of the ambient light 405a admitted via the filter sections 410 may include spectral content associated with a morning time period. In addition, the combined intensity of the ambient light 405b may include spectral content associated with an afternoon time period.

In some cases, the microprocessor 430 may calculate the combined intensity of light admitted via a combination of the filter sections 410. In addition, the microprocessor 430 may determine a relative change in spectral content of the admitted ambient light, such as a change during morning time period or between the morning and afternoon time periods. For example, the microprocessor 430 may access one or more historical sets of color data signals, such as from the historical color data 440, that describe one or more historical characteristics of light admitted via the filter sections 410, such as intensity or spectral content. In addition, the microprocessor 430 may determine the relative change in spectral content based on a comparison of characteristics of ambient light currently admitted via the filter sections 410, historical characteristics of ambient light admitted via the filter sections 410, or any suitable combination of current or historical color data signals.

In some implementations, a filter correction set may be determined based on spectral content of ambient light received by a photocontrol. The filter correction set may describe one or more spectral adjustment values for one or more color data signals generated by a photosensor in the photocontrol. In some cases, a self-orienting photocontrol may apply a spectral adjustment value to a color data signal for a particular color or at a particular period of a diurnal cycle. The spectral adjustment value may modify (e.g., correct) the color data signal describing light components received via a particular filter section at a particular time of day. For example, during late afternoon or evening, a photocontrol may receive a large amount of ambient light having a red color. If the photocontrol has a green filter section that faces generally west and a red filter section that faces generally north, the red filter section may admit a larger amount of ambient light than the green filter section during late afternoon or evening, although the green filter section faces west. In some cases, the photocontrol may apply a filter correction set to reduce a "red" value in a color data signal during the late afternoon and evening. Based on the adjusted color data signal, the photocontrol may more accurately determine a direction of the red and green filter sections, or more accurately determine a geographical orientation of the photocontrol.

For example, the photocontrol 470 may include a color filter correction dataset 480. The color filter correction dataset 480 may include one or more spectral adjustment values, such as a spectral adjustment value 485. In addition, the spectral adjustment value 485 may include data describing a modification to a color data signal, such as a color data signal received from the photosensor 415. The spectral adjustment value 485 may be associated with a time period, such as a time period that is associated with one or more of the ambient light 405a or 405b. In some cases, the microprocessor 430 may determine the spectral adjustment value 485. For example, the microprocessor 430 may determine spectral content of the ambient light 405. The spectral content may be associated with time periods of the ambient light 405, such as a relative change of spectral content within or between time periods. Based on the spectral content or the relative change of the spectral content, the microprocessor 430 may determine the spectral adjustment value 485. In addition, the microprocessor 430 may apply the color filter correction dataset 480 to a color data signal received from the photosensor 415. The color data signal may be adjusted via the spectral adjustment value 485.

In an example, the filter section 410g may face generally west and the filter section 410r may face generally north. During an afternoon time period, the filter section 410g may receive a relatively large portion of the ambient light 405b as compared to the filter section 410r. In addition, based on the ambient light 405b having a generally red color (e.g., associated with late afternoon or early evening) the photosensor 415 may detect a relatively large portion of ambient light admitted via the filter section 410r as compared to the filter section 410g. In some cases, if a filter correction set were not applied, a photocontrol might inaccurately determine that the filter section 410r faced west. In FIG. 4, the microprocessor 430 may apply the color filter correction dataset 480 to the color data signal generated by the photosensor 415. In addition, the color data signal may be modified by the spectral adjustment value 485, such as to reduce a value describing an intensity of red light. Based on the modified color data signal, the microprocessor 430 may determine that the filter section 410g admits a relatively large portion of the ambient light 405 as compared to the filter section 410r. In addition, based on the modified color data signal, the microprocessor 430 may determine with increased accuracy that the filter section 410g faces generally west.

In some implementations, the photocontrol 470 may determine one or more ambient light differentials, such as an instant ambient light differential or a temporal ambient light differential. In some cases, the ambient light differential may be determined based on a difference (or other comparison) between light intensities of ambient light received via the filter sections 410. In addition, the ambient light differential be determined based on a modified color data signal, such as a color data signal is modified based on the color filter correction dataset 480. In some cases, the historical color data 440 may describe the one or more ambient light differentials. For example, the historical color data 440 may indicate one or more historical instant ambient light differentials between historical intensities of light received via one or more of the filter sections 410. In some cases, multiple instant ambient light differentials, such as pairwise instant differentials, may be determined for a particular time period of a diurnal cycle (e.g., a particular timestamp or range of timestamps). For example, the microprocessor 430 may determine one or more of a first instant ambient light differential between intensities of light received via the filter sections 410r and 410b, a second instant ambient light differential between intensities of light received via the filter sections 410r and 410g, or a third instant ambient light differential between intensities of light received via the filter sections 410b and 410g. The first, second, and third instant ambient light differentials to be associated with a particular time or range of times during a diurnal cycle. The historical color data 440 may include one or more historical sets of color data signals indicating a sequence of the instant ambient light differentials that respective times (or ranges of times), such as a first set of instant ambient light differentials among each pair of the filter sections 410 at a first time, a second set of instant differentials among each pair of the filter sections 410 at a second time, or one additional sets of instant differentials among each pair of the filter sections 410 at respective additional times.

In FIG. 4, the microprocessor 430 may determine one or more temporal ambient light differentials, such as between time periods of the diurnal cycle. The temporal differential may be based on one or more of a current instant ambient light differential, a historical instant ambient light, or combinations of multiple historical instant ambient light differentials. For example, the microprocessor 430 may determine a set of current instant ambient light differentials among pairs of the filter sections 410 based on the ambient light 405b. In addition, the microprocessor 430 may access, such as in the historical color data 440, a set of historical instant ambient light differentials among pairs of the filter sections 410 based on the ambient light 405a. In some cases, the microprocessor 430 may calculate a temporal ambient light differential based on a comparison of one or more of the current instant differentials with one or more of the historical instant differentials. For example, a temporal ambient light differential may be determined for the pair of filter sections 410r and 410b based on the current and historical instant differentials for the pair of filter sections 410r and 410b. In FIG. 4, a temporal ambient light differential may indicate a change of light intensities that are received via the filter sections 410 across multiple time periods, such as intensity changes of colored light across the time periods associated with the ambient light 405. In some cases, a temporal ambient light differential may be associated with a diurnal cycle or a periodicity. In addition, the intelligent lighting fixture may determine one or more of a geographical orientation or a lighting output level based on determining the association of the temporal ambient light differential with the diurnal cycle, periodicity, or any other time-related characteristics.

Based on one or more ambient light differentials, including instant differentials or temporal differentials, the photocontrol 470 may identify that one or more of the filter sections 410 is a triggering section for the photocontrol 270. For instance, the photocontrol 470 may compare temporal ambient light differentials calculated for each pair of the filter sections 410. Based on the comparison, the photocontrol 470 may determine that the filter section 410r admits ambient light levels that have a least amount of variation between time periods, as compared to ambient light levels admitted via the filter sections 410g and 410b. Responsive to determining that the filter sections 410r receives ambient light levels having a least amount of variation, the photocontrol 470 may create or modify data identifying the filter section 410r as the triggering section. In some implementations, the lighting controller 490 may modify lighting output of the lighting element 450, based on an additional data signal associated with the triggering section. For example, the photosensor 415 may generate an additional color data signal indicating ambient light levels admitted via the triggering section. The photocontrol 470 may provide the additional color data signal to the lighting controller 490. If the additional color data signal indicates that ambient light levels admitted via the triggering section have fallen below (or risen above) a threshold light level, the lighting controller 490 may control the lighting element 450 to increase (or decrease) lighting output.

In some implementations, the photocontrol 470 may identify a geographical orientation of the photocontrol 470 or one or more of the filter sections 410 based on one or more ambient light differentials, including instant differentials or temporal differentials. For example, the microprocessor 430 may determine, based on one or more temporal differentials between one or more pairs of light intensities received via the filter sections 410, that the photocontrol 470 has a geographical orientation in which the filter section 410b is located at a section that faces generally southeast, the filter section 410r is located at a section that faces generally north, and the filter section 410g is located a section that faces generally southwest. In some cases, the geographical orientation of the photocontrol 470 may be determined based on one or more additional ambient light differentials (such as instant differentials or temporal differentials) associated with one or more additional filter sections that are respectively located at additional sections of the photocontrol 470. In some cases, the photocontrol 470 may identify the geographical orientation based on additional data indicating a location of the photocontrol 470 (e.g., coordinate data received from a GPS module, region data received during manufacturing of the photocontrol 470), such as location data indicating that the photocontrol 470 is located in the Northern Hemisphere, Southern Hemisphere, an equatorial region, etc.

In some cases, one or more of the photocontrol 470 or the lighting fixture 420 may identify the lighting output profile 455 based on the identified triggering section. The lighting output profile 455 may describe output levels of the lighting element 450. In some cases, one or more of the output levels described by the lighting output profile 455 may be determined based on one or more ambient light levels detected via the triggering section. For example, the lighting output profile 455 may describe output levels that are based on one or more color data signals indicating ambient light levels received via the triggering section. The lighting fixture 420 may modify an output level of the lighting element 450 based on one or more of the lighting output profile 455 or on one or more color data signals describing an additional light intensity admitted via the triggering filter section.

In some implementations, the photocontrol 470 may determine a diurnal cycle associated with the ambient light 405, such as a diurnal cycle determined based on comparisons of ambient light differentials, relationships between ambient light differentials, or other suitable data describing the ambient light 405 received via the filter sections 410. In addition, the photocontrol 470 may determine a periodicity associated with one or more temporal ambient lights differentials. Further, one or more of the triggering section or a geographical orientation of the photocontrol 470 may be identified based on one or more relative locations of the filter sections 410.

Figure 5:
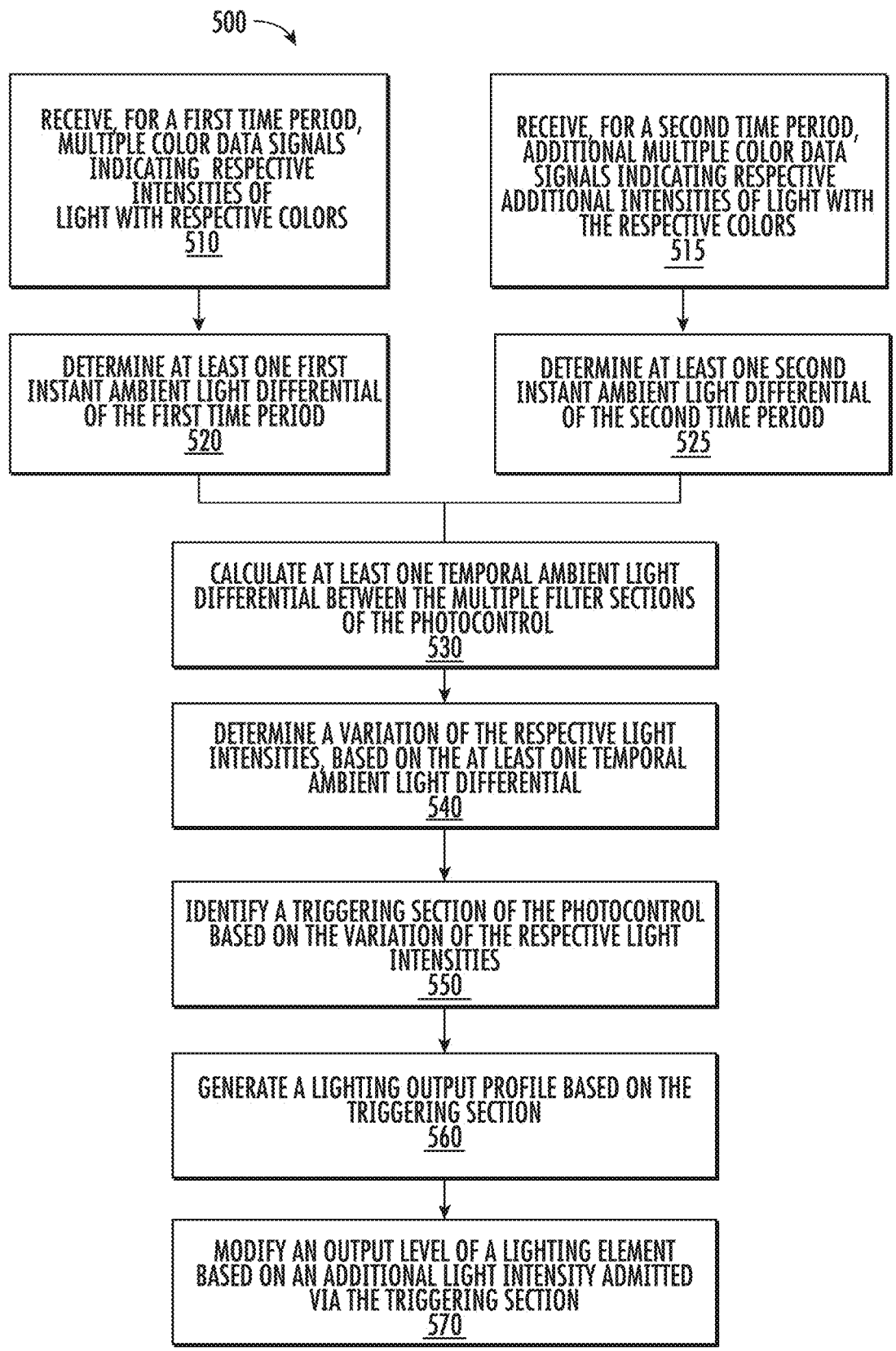
FIG. 5 is a flow chart depicting an example of a process for identifying a triggering photosensor or geographical orientation of a photocontrol based on intensities of ambient colored light components admitted via filter sections in the photocontrol, according to certain implementations.

FIG. 5 is a flowchart depicting an example of a process 500 for identifying one or more of a triggering section or a geographical orientation of a photocontrol, such as a photocontrol mounted on (or otherwise associated with) an outdoor intelligent lighting fixture. In the process 500, the triggering section may be identified based on variation of an intensity of light having a particular color that is admitted via a particular filter section in the photocontrol. In some implementations, such as described in regards to FIGS. 1-4, a microprocessor (or other computing device) included in a photocontrol implements operations described in FIG. 5, by executing suitable program code. For illustrative purposes, the process 500 is described with reference to the examples depicted in FIGS. 1-4. Other implementations, however, are possible.

At block 510, the process 500 may involve receiving one or more color data signals indicating respective intensities of light components having respective colors. The light intensities may be received at a first time period of a diurnal cycle. In some cases, the respective light components may be admitted via respective filter sections of the photocontrol, such as respective filter sections having colors that correspond to the light components. In addition, each color data signal may be generated by a photosensor that receives the light having the respective colors. For example, the microprocessor 430 may receive from the photosensor 415 a first color data signal indicating an intensity of light having a red color that is admitted via the filter section 410r, a second color data signal indicating an intensity of light having a blue color admitted via the filter section 410b, and a third color data signal indicating an intensity of light having a green color admitted via the filter section 410g.

At block 515, the process 500 may involve receiving one or more additional color data signals indicating respective additional intensities of light components having the respective colors. The additional light intensities may be received at a second time period of the diurnal cycle. In some cases, the additional light components may be admitted via the respective filter sections of the photocontrol. For example, the microprocessor 430 may receive from the photosensor 415 a fourth color data signal indicating an additional intensity of red light via the filter section 410r, a fifth color data signal indicating an additional intensity of blue light via the filter section 410b, and a sixth color data signal indicating an additional intensity of green light via the filter section 410g.

In some implementations, one or more of the color data signals may be modified based on one or more filter correction sets. For example, the microprocessor 430 may modify one or more color data signals received from the photosensor 415 based on the spectral adjustment value 485 in the color filter correction dataset 480.

At block 520, the process 500 may involve determining at least one first instant ambient light differential associated with the first time period. The first instant ambient light differentials may be based on the intensities of light received during the first time period, such as light intensities described by one or more of the first, second, and third color data signals. At block 525, the process 500 may involve determining at least one second instant ambient light differential associated with the second time period. The second instant ambient light differentials may be based on the intensities of light received during the second time period, such as light intensities described by one or more of the fourth, fifth, and sixth color data signals. In some cases, each instant ambient light differential indicates a difference (or other comparison) between intensities of light. For example, the microprocessor 430 may determine first pairwise instant ambient light differentials between each pair of the light intensities received via the filter sections 410 at the first time period (e.g., morning). In addition, the microprocessor 430 may determine second pairwise instant ambient light differentials between each pair of the light intensities received via the filter sections 410 at the second time period (e.g., afternoon).

At block 530, the process 500 may involve calculating one or more temporal ambient light differentials. Each of the temporal ambient light differentials may be calculated between the respective intensities of light received at the first and second time periods. In some cases, each calculated temporal ambient light differential may be associated with multiple filter sections of the photocontrol. For example, the microprocessor 430 may calculate a first temporal differential between light intensities admitted via the filter sections 410*r* and 410*b*, a second temporal differential between light intensities admitted via the filter sections 410*r* and 410*g*, and a third temporal differential between light intensities admitted via the filter sections 410*b* and 410*g*.

In some implementations, one or more ambient light differentials (including instant or temporal differentials) may be determined based on current data, such as a data signal received from a photosensor indicating an intensity of colored light currently received by the photosensor. In addition, one or more ambient light differentials may be determined based on historical data, such as stored data indicating a color data signal received from a photosensor at a previous time. In some cases, an instant or temporal ambient light differential may, but need not, be determined based on current data. For example, a photocontrol may calculate an instant or temporal ambient light differential associated with a first time period, such as morning, during a second time period, such as during the afternoon.

At block 540, the process 500 may involve determining a variation of the respective light intensities received via the multiple filter sections of the photocontrol. The variation may be determined based on at least one temporal ambient light differential. In addition, the variation may be determined between (or among) light intensities admitted via at least one of the filter sections across multiple time periods. For example, the photocontrol 470 may compare temporal ambient light differentials between each pair of the filter sections 410*r*, 410*b*, and 410*g*. Based on the comparison, the photocontrol 470 may determine whether a particular one of the filter sections 410 receives light intensities that vary more or less during a diurnal cycle, as compared to intensities received by the other filter sections 410. For instance, the photocontrol 470 may determine that a particular filter section, e.g., 410*r*, admits light with an intensity that has a particular variation between time periods, e.g., as light levels change between morning and afternoon. In addition, the photocontrol 470 may determine that the light intensities admitted via the filter sections 410*r* vary less across the time periods as compared to intensities admitted via the filter sections 410*b* or 410*c*.

At block 550, the process 500 may involve identifying a triggering section of the photocontrol. The triggering section may be identified based on the temporal ambient light differential. For example, based on the one or more temporal ambient light differentials, the photocontrol may identify the triggering section as a particular filter section, or combination of filter sections, that admits light with intensities that vary the least. For example, responsive to determining that the filter sections 410*r* admits light with intensities that vary the least as compared to the other filter sections 410, the microprocessor 430 may identify the filter section 410*r* as the triggering section of the photocontrol 470. In some cases, the triggering section may be identified as a combination of multiple filter sections, such as a pair of filter sections that admit light intensities with similar amounts of variation. In some cases, a geographical orientation is determined based on the triggering section or one or more temporal ambient light differentials. In addition, the geographical orientation may indicate the relative orientation of a particular filter section or the photocontrol with respect to a direction, a coordinate system, an additional photocontrol, or any other suitable orientation system.

At block 560, the process 500 may involve generating or modifying a lighting output profile, such as a lighting output profile for a lighting element included in the intelligent lighting fixture that includes the photocontrol. In some cases, the lighting output profile may be generated or modified based on the triggering section. For example, the lighting output profile may indicate that a particular filter section (or combination of filter sections) is the triggering section. In addition, the lighting output profile may describe one or more sets of output levels for the lighting element. In some cases, the lighting output profile includes at least one output level that is determined based on an additional light intensity admitted via the triggering section. For example, the microprocessor 430 may modify the lighting output profile 455 responsive to determining that the filter section 410*r* is the triggering section for the photocontrol 470. Based on the triggering section indicated by the profile 455, the photocontrol 470 may provide to the lighting fixture 420 a data signal describing ambient light levels detected by the photosensor 415 via the triggering section. In addition, the lighting controller 490 may control the lighting element 450 based on the data signal associated with the triggering section, such as by increasing (or decreasing) lighting output if the detected ambient light levels are below (or above) a threshold level. The photocontrol 470 may provide to the lighting fixture 420 one or more of the lighting profile 455, a data signal associated with the triggering section, orientation data identifying the triggering section, or other suitable data. In some cases, the orientation data may indicate a geographical direction with respect to the photocontrol 470. In addition, the orientation data may indicate a relative position of the photocontrol 470 with respect to the lighting fixture 420.

In some implementations, the lighting output profile 455 may include a set of output levels for the lighting element 450. In addition, at least one of the output levels in the lighting output profile 455 may be determined based on a color data signal from the photosensor 415 indicating light intensity received via the triggering section. In some cases, the lighting output profile 455 may indicate a filter correction set for the triggering section. For instance, the lighting output profile 455 may indicate that light intensities admitted via the triggering section are adjusted based on the spectral adjustment value 485. The lighting controller 490 may modify output of the lighting element 450 responsive to determining that the adjusted light intensity admitted via the triggering section is exceeds (or has another suitable relation to) a threshold value.

At block 570, the process 500 may involve modifying one or more output levels of one or more lighting elements included in the intelligent lighting fixture. The output level may be modified based on the lighting output profile. For example, output of the lighting element 450 may be modified based on the lighting output profile 455. In some cases, the output of the lighting element is modified responsive to one or more output levels that are determined based on light intensities admitted via the triggering section.

In some implementations, operations related to one or more blocks of the process 500 may be repeated. For example, operations related to one or more of blocks 510 or 515 may be repeated, such as for various time periods associated with respective ambient light. In addition, operations related to at least blocks 520, 525, or 530 may be repeated, such as to calculate instant or temporal ambient light differentials based on updated data indicating intensities of light received via one or more filter sections. Further, operations related to one or more of blocks 540, 550, or 560 may be repeated, such as to recalibrate the identified triggering section of the intelligent lighting fixture.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A photocontrol for a lighting fixture, the photocontrol comprising:
   (i) a first photosensor configured to detect a first ambient light level at a first section of the photocontrol,
   (ii) a second photosensor configured to detect a second ambient light level at a second section of the photocontrol,
   (iii) a third photosensor configured to detect a third ambient light level at a third section of the photocontrol, wherein the first, second and third sections of the photocontrol receive various ambient light levels at various periods of a diurnal cycle, and
   a microprocessor configured for:
      determining, at a first time period of the diurnal cycle, respective first pairwise instant ambient light differentials between first light levels detected respectively by each pair of the first, second, and third photosensors;
      determining, at a second time period of the diurnal cycle, respective second pairwise instant ambient light differentials between second light levels detected respectively by each pair of the first, second, and third photosensors;
      calculating a first temporal ambient light differential between the first section and the second section of the photocontrol, a second temporal ambient light differential between the first section and the third section of the photocontrol, and a third temporal ambient light differential between the second section and the third section of the photocontrol, the first, second, and third temporal ambient light differentials being based on the respective first pairwise instant ambient light differentials at the first time period of the diurnal cycle and the respective second pairwise instant ambient light differentials at the second time period of the diurnal cycle;
      identifying, based on a comparison of the first, second, and third temporal ambient light differentials, that the first photosensor is a triggering photosensor of the photocontrol, wherein the comparison of the first, second, and third temporal ambient light differentials indicates that the first photosensor has detected ambient light levels having a least variation between the first and second time periods of the diurnal cycle; and
      modifying, based on a fourth ambient light level detected via the triggering photosensor, an output level of a lighting element of the lighting fixture.

2. The photocontrol of claim 1, the microprocessor further configured for:
   identifying a geographical orientation of the photocontrol based on identifying the triggering photosensor.

3. The photocontrol of claim 1, the microprocessor further configured for:
   determining a periodicity of the first temporal ambient light differential,
   wherein modifying the output level is based further on the periodicity of the first temporal ambient light differential.

4. The photocontrol of claim 1, wherein identifying the triggering photosensor is further based on a relative location of the first section of the photocontrol with respect to the second section or the third section of the photocontrol.

5. The photocontrol of claim 4, wherein the relative location includes one or more of (i) an angular separation of the first section of the photocontrol with respect to the second section or the third section of the photocontrol, or (ii) a distance between the first section of the photocontrol and the second section or the third section of the photocontrol, such that identifying the triggering photosensor is further based on one or more of the angular separation or the distance.

6. The photocontrol of claim 1, further comprising at least one additional photosensor configured to detect an additional ambient light level at an additional section of the photocontrol,
the microprocessor further configured for determining additional respective pairwise instant ambient light differentials between the additional ambient light level detected via the additional photosensor and each of the first ambient light level, the second ambient light level, and the third ambient light level,
wherein the triggering photosensor further includes a combination of the first photosensor and the additional photosensor.

7. A method of orienting a photocontrol for a lighting fixture, the method comprising:
receiving, from a first photosensor, a first data signal indicating a first ambient light level at a first section of the photocontrol;
receiving, from a second photosensor, a second data signal indicating a second ambient light level at a second section of the photocontrol, wherein the first section and the second section of the photocontrol receive various ambient light levels at various periods of a diurnal cycle;
determining, at a first time period of the diurnal cycle, a first instant ambient light differential between a first light level detected via the first photosensor and a second light level detected via the second photosensor;
determining, at a second time period of the diurnal cycle, a second instant ambient light differential between a third light level detected via the first photosensor and a fourth light level detected via the second photosensor;
calculating, based on the first instant ambient light differential and the second instant ambient light differential, a temporal ambient light differential between the first section of the photocontrol and the second section of the photocontrol, the temporal ambient light differential being between the first time period and second time period of the diurnal cycle;
determining, based on the temporal ambient light differential, a variation of the ambient light levels detected via the first photosensor and the second photosensor between the first and second time periods of the diurnal cycle;
identifying, based on the variation of the ambient light levels, a triggering photosensor of the photocontrol, wherein the triggering photosensor is identified as at least one of the first photosensor or the second photosensor; and
modifying, based on a further data signal indicating a further ambient light level detected via the triggering photosensor, an output level of a lighting element included in the lighting fixture.

8. The method of claim 7, further comprising:
accessing a first historical sequence of ambient light levels detected via the first photosensor and a second historical sequence of ambient light levels detected via the second photosensor;
determining a current instant ambient light differential between the first ambient light level and the second ambient light level; and
determining a historical instant ambient light differential between a first historical light level included in the first historical sequence and a second historical light level included in the second historical sequence,
wherein calculating the temporal ambient light differential is further based on a comparison of the current instant ambient light differential and the historical instant ambient light differential.

9. The method of claim 7, further comprising:
identifying a geographical orientation of the photocontrol based on identifying the triggering photosensor.

10. The method of claim 7, further comprising:
determining a periodicity of the temporal ambient light differential,
wherein modifying the output level of the lighting element is based further on the periodicity of the temporal ambient light differential.

11. The method of claim 7, wherein identifying the triggering photosensor is further based on a relative location of the first section of the photocontrol with respect to the second section of the photocontrol.

12. The method of claim 11, wherein the relative location includes one or more of (i) an angular separation of the first section of the photocontrol with respect to the second section of the photocontrol, or (ii) a distance between the first section of the photocontrol and the second section of the photocontrol, such that identifying the triggering photosensor is further based on one or more of the angular separation or the distance.

13. The method of claim 7, further comprising:
receiving, from an additional photosensor, an additional data signal indicating an additional ambient light level at the first time period at an additional section of the photocontrol; and
calculating, based on the additional data signal, additional instant ambient light differentials between the additional ambient light level and each of the first light level and the second light level,
wherein identifying the triggering photosensor is further based on the additional instant ambient light differentials.

14. A photocontrol for a lighting fixture, the photocontrol comprising:
a color filter having multiple filter sections, each particular filter section configured to admit ambient light having a particular color, wherein each particular filter section receives various ambient light levels at various periods of a diurnal cycle,
a photosensor configured to generate one or more color data signals, each particular color data signal indicating an intensity of the ambient light having the particular color admitted via the particular filter section, and
a microprocessor configured for:
receiving, from the photosensor and at a first time period of the diurnal cycle, a first color data signal indicating a first intensity of ambient light having a first color admitted via a first filter section and a second color data signal indicating a second intensity of ambient light having a second color admitted via a second filter section;

determining, based on the first color data signal and the second color data signal, a first instant ambient light differential between the first intensity of the ambient light and the second intensity of the ambient light at the first time period of the diurnal cycle;

receiving, from the photosensor and at a second time period of the diurnal cycle, a third color data signal indicating a third intensity of the ambient light having the first color admitted via the first filter section and a fourth color data signal indicating a fourth intensity of the ambient light having the second color admitted via the second filter section;

determining, based on the first color data signal and the second color data signal, a second instant ambient light differential between the third intensity of the ambient light and the fourth intensity of the ambient light at the second time period of the diurnal cycle;

calculating, based on the first instant ambient light differential and the second instant ambient light differential, a temporal ambient light differential between the first filter section and the second filter section, the temporal ambient light differential being between the first time period and second time period of the diurnal cycle;

determining, based on the temporal ambient light differential, a variation of ambient light intensities admitted via the first filter section and the second filter section between the first and second time periods of the diurnal cycle;

identifying, based on the temporal ambient light differential, a triggering section of the photocontrol, wherein the triggering section is identified based on a combination of the one or more color data signals of the photosensor; and modifying, based on an additional light intensity admitted via the triggering section, an output level of a lighting element of the lighting fixture.

15. The photocontrol of claim 14, the microprocessor further configured for:

accessing a first historical set of color data signals indicating historical intensities of the ambient light having the first color and a second historical set of color data signals indicating historical intensities of the ambient light having the second color;

determining a historical instant ambient light differential between a first historical intensity of the ambient light having the first color and a second historical intensity of the ambient light having the second color; and calculating the temporal ambient light differential based on a comparison of the historical instant ambient light differential with one or more of the first instant ambient light differential or the second instant ambient light differential, wherein identifying the triggering section is further based on the temporal ambient light differential.

16. The photocontrol of claim 14, the microprocessor further configured for:

identifying a geographical orientation based on identifying the triggering section.

17. The photocontrol of claim 15, the microprocessor further configured for:

determining a periodicity of the temporal ambient light differential, wherein modifying the output level is based further on the periodicity of the temporal ambient light differential.

18. The photocontrol of claim 14, the microprocessor further configured for:

determining a local ambient light spectral pattern received by the photosensor; and applying, during the first time period, a first filter correction set, the first filter correction set describing a spectral adjustment value for the first color data signal during the first time period.

19. The photocontrol of claim 18, wherein determining the local ambient light spectral pattern comprises:

accessing a historical set of color data signals, the historical set including previous color data signals indicating historical intensities of the ambient light having each particular color admitted via each particular filter section;

calculating, based on the previous color data signals, a combined intensity of the ambient light admitted via a combination of each particular filter section;

determining a relative change in spectral content of the combined intensity of the ambient light during the first time period as compared to the second time period; and determining the spectral adjustment value, wherein the spectral adjustment value indicates the relative change in the spectral content during the first time period.

20. The photocontrol of claim 14, wherein each particular filter section is respectively positioned at a particular section of the photocontrol, such that each particular filter section has a respective angular separation with respect to each additional particular filter section, wherein identifying the triggering section is further based on the respective angular separation of each particular filter section with respect to each additional particular filter section.

* * * * *